(12) United States Patent
Nakaie

(10) Patent No.: US 11,795,270 B2
(45) Date of Patent: Oct. 24, 2023

(54) TRIAZINE RING-CONTAINING POLYMER AND FILM FORMING COMPOSITION CONTAINING SAME

(71) Applicant: Nissan Chemical Corporation, Tokyo (JP)

(72) Inventor: Naoki Nakaie, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/770,761

(22) PCT Filed: Oct. 23, 2020

(86) PCT No.: PCT/JP2020/039925
§ 371 (c)(1),
(2) Date: Apr. 21, 2022

(87) PCT Pub. No.: WO2021/079991
PCT Pub. Date: Apr. 29, 2021

(65) Prior Publication Data
US 2022/0396666 A1    Dec. 15, 2022

(30) Foreign Application Priority Data

Oct. 25, 2019 (JP) ................ 2019-193993
Mar. 30, 2020 (JP) ................ 2020-060764
Apr. 9, 2020 (JP) ................ 2020-070200

(51) Int. Cl.
C08G 73/06   (2006.01)
C09D 7/20    (2018.01)
C09D 179/04  (2006.01)
G02B 1/04    (2006.01)

(52) U.S. Cl.
CPC .......... C08G 73/0644 (2013.01); C09D 7/20 (2018.01); C09D 179/04 (2013.01); G02B 1/04 (2013.01)

(58) Field of Classification Search
CPC .... C08G 73/0644; C09D 7/20; C09D 179/04; G02B 1/04
USPC ....................................... 524/609
See application file for complete search history.

(56) References Cited

U.S. PATENT DOCUMENTS

| | | |
|---|---|---|
| 2012/0049308 A1 | 3/2012 | Nishimura et al. |
| 2014/0008751 A1 | 1/2014 | Nishimura et al. |
| 2016/0017145 A1 | 1/2016 | Maeda et al. |
| 2017/0362382 A1 | 12/2017 | Nishimura et al. |
| 2018/0142064 A1* | 5/2018 | Nishimura ......... C08G 73/0644 |
| 2018/0215870 A1 | 8/2018 | Nishimura et al. |
| 2019/0169371 A1 | 6/2019 | Nishimura |

FOREIGN PATENT DOCUMENTS

| | | |
|---|---|---|
| JP | 9-87385 A | 3/1997 |
| JP | 09087385 A * | 3/1997 |
| JP | 2004-156001 A | 6/2004 |
| JP | 2004156001 A * | 6/2004 |
| JP | 2018-199774 A | 12/2018 |
| WO | WO 2010/128661 A1 | 11/2010 |
| WO | WO 2014/136871 A1 | 9/2014 |
| WO | WO 2015/098787 A1 | 7/2015 |
| WO | WO 2015/098788 A1 | 7/2015 |
| WO | WO 2016/024613 A1 | 2/2016 |
| WO | WO 2016/114337 A1 | 7/2016 |
| WO | WO 2017/094643 A1 | 6/2017 |
| WO | WO 2017/138547 A1 | 8/2017 |

OTHER PUBLICATIONS

Translation of JP 09-087385 (Application H07-239477), Mar. 31, 1997. (Year: 1997).*
Translation of JP 2004-156001 (Application 2002-358716), Jun. 3, 2004. (Year: 2004).*
International Search Report, issued in PCT/JP2020/039925, PCT/ISA/210, dated Dec. 22, 2020.
Written Opinion of the International Searching Authority, issued in PCT/JP2020/039925, PCT/ISA/237, dated Dec. 22, 2020.

* cited by examiner

*Primary Examiner* — Hui H Chin
(74) *Attorney, Agent, or Firm* — Birch, Stewart, Kolasch & Birch, LLP

(57) ABSTRACT

For example, a triazine ring-containing polymer containing a repeating unit structure represented by formula (25) below,

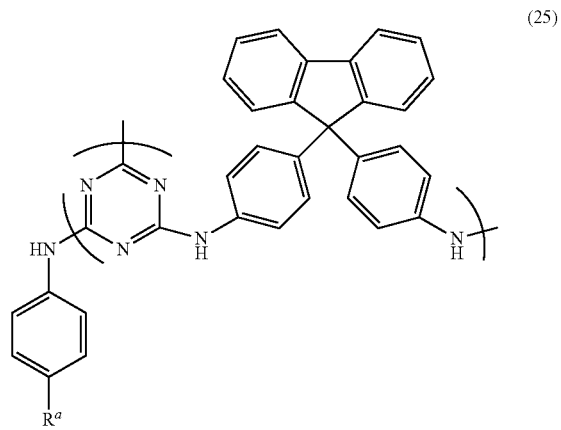

(25)

wherein $R^a$ represents $R^{102}$ or $R^{103}$, $R^{102}$ represents a fluorine atom or a fluoroalkyl group having 1 to 10 carbon atoms, and $R^{103}$ represents a crosslinking group.

17 Claims, 3 Drawing Sheets

200 μm

200 μm

TRIAZINE RING-CONTAINING POLYMER AND FILM FORMING COMPOSITION CONTAINING SAME

TECHNICAL FIELD

The present invention relates to a triazine ring-containing polymer and a film forming composition containing the same.

BACKGROUND ART

In recent years, there have been demands for highly functional polymer material, in developing electronic devices such as liquid crystal display, organic electroluminescence (EL) element (organic EL display and organic EL lighting), touch panel, optical semiconductor (LED) element, solid-state image sensor, organic thin-film solar cell, dye-sensitized solar cell, and organic thin-film transistor (TFT).

Specific properties required therefor include 1) heat resistance, 2) transparency, 3) high refractive index, 4) high solubility, 5) low volume shrinkage, 6) hot-humid resistance, and 7) high film hardness.

In this regard, the present applicant has already found that a polymer that contains a repeating unit having a triazine ring and an aromatic ring demonstrates a high refractive index; that such polymer can achieve, solely by itself, high heat resistance, high transparency, high refractive index, high solubility, and low volume shrinkage; and that the polymer is therefore suitable for a film-forming composition when manufacturing the electronic devices (Patent Literature 1).

A planarization layer or a light scattering layer, for example, of the organic EL lighting has been formed usually by coating, with use of a composition prepared by dissolving a high refractive index material in an organic solvent, occasionally prohibiting use of a high polarity solvent on some sort of transparent electroconductive film.

Another problem can arise when coating a film-forming composition that contains a high refractive index polymer with use of a coater, occasionally followed by line cleaning of the device with use a low-polarity solvent, the line would be clogged if the polymer is less soluble to such solvent. Furthermore, when exposing the film to the solvent during manufacture of the electronic device, the formed film would get cracks under some condition, calling for further improvement in the durability.

CITATION LIST

Patent Literature

Patent Literature 1: WO 2010/128661

SUMMARY OF INVENTION

Technical Problem

The present invention has been conceived in consideration of the aforementioned circumstances, and an object of which is to provide a triazine ring-containing polymer capable of forming a film that has high refractive index and excels in transparency and solvent resistance (crack resistance), and is highly soluble in various organic solvents such as low-polarity solvent, hydrophobic solvent, and low-boiling point solvent; and a film-forming composition containing the same.

Solution to Problem

After thorough investigations aimed at achieving the object, the present inventors have found that a triazine ring-containing polymer capable of forming a film that has high refractive index and excels in transparency and solvent resistance, and is highly soluble in various organic solvents, is obtainable by using a triazine ring-containing polymer which has at least one triazine ring terminal, and at least a part of the triazine ring terminal is blocked with a fluorine atom-containing arylamino group and with an arylamino group having crosslinking group.

That is, the present invention provides a triazine ring-containing polymer, and a film-forming composition, as below.

[1] A triazine ring-containing polymer including a repeating unit structure represented by formula (1) below, having at least one triazine ring terminal, and at least a part of the triazine ring terminal being blocked with a fluorine atom-containing arylamino group and with an arylamino group having crosslinking group,

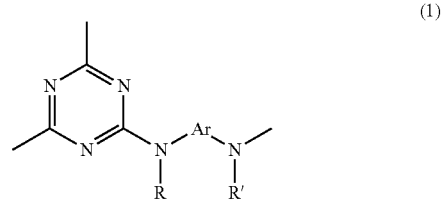

wherein each of R and R' independently represents a hydrogen atom, an alkyl group, an alkoxy group, an aryl group, or an aralkyl group, and Ar represents at least one selected from the group represented by formulae (2) to (13),

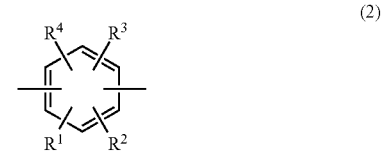

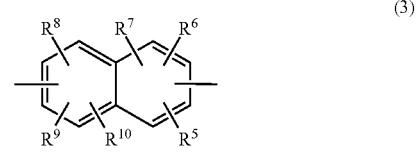

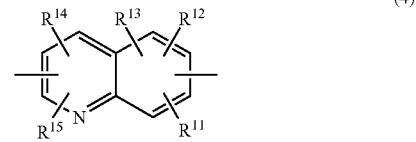

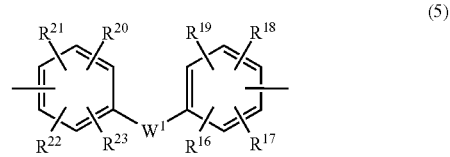

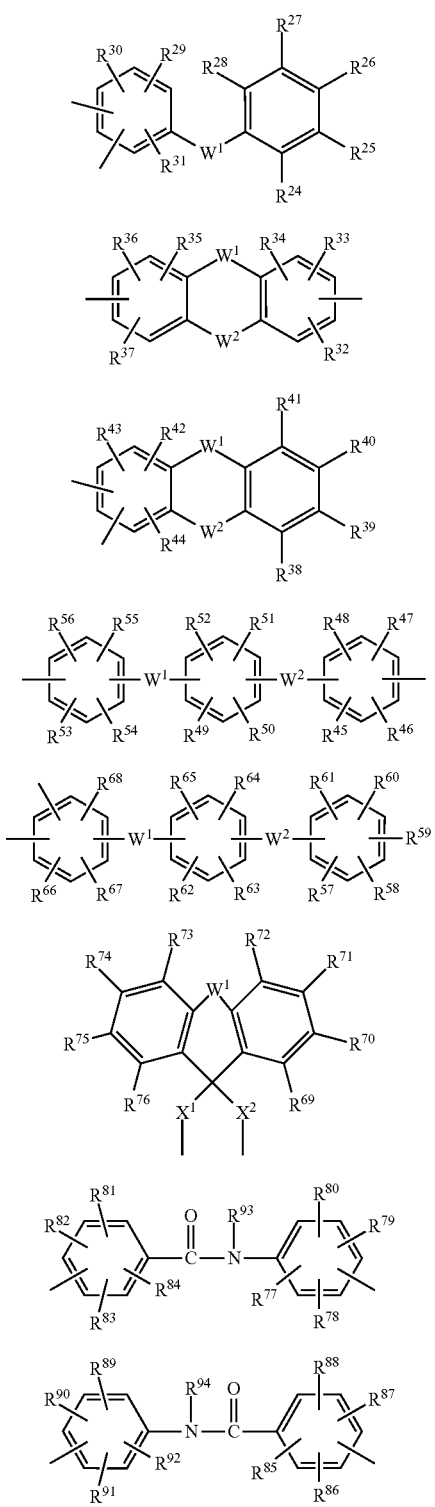

(6)
(7)
(8)
(9)
(10)
(11)
(12)
(13)

wherein each of $R^1$ to $R^{92}$ independently represents a hydrogen atom, a halogen atom, a carboxy group, a sulfo group, an alkyl group having 1 to 10 carbon atoms, a halogenated alkyl group having 1 to 10 carbon atoms, or an alkoxy group having 1 to 10 carbon atoms, each of $R^{93}$ and $R^{94}$ represents a hydrogen atom or an alkyl group having 1 to 10 carbon atoms, each of $W^1$ and $W^2$ independently represents a single bond, $CR^{95}R^{96}$ (each of $R^{95}$ and $R^{96}$ independently represents a hydrogen atom or an alkyl group having 1 to 10 carbon atoms (where, they may form a ring together)), C=O, O, S, SO, $SO_2$, or $NR^{97}$ ($R^{97}$ represents a hydrogen atom, an alkyl group having 1 to 10 carbon atoms, or a phenyl group), each of $X^1$ and $X^2$ independently represents a single bond, an alkylene group having 1 to 10 carbon atoms, or a group represented by formula (14),

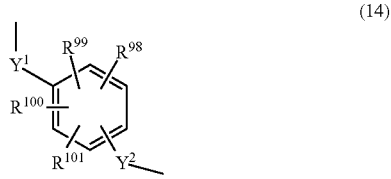

(14)

wherein each of $R^{98}$ to $R^{101}$ independently represents a hydrogen atom, a halogen atom, a carboxy group, a sulfo group, an alkyl group having 1 to 10 carbon atoms, a halogenated alkyl group having 1 to 10 carbon atoms, or an alkoxy group having 1 to 10 carbon atoms, and each of $Y^1$ and $Y^2$ independently represents a single bond or an alkylene group having 1 to 10 carbon atoms.

[2] The triazine ring-containing polymer according to [1], wherein each of $R^1$ to $R^{92}$ and $R^{98}$ to $R^{101}$ represents a hydrogen atom.

[3] The triazine ring-containing polymer according to [1] or [2], wherein the fluorine atom-containing arylamino group is represented by formula (15),

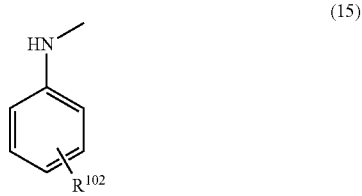

(15)

wherein $R^{102}$ represents a fluorine atom or a fluoroalkyl group having 1 to 10 carbon atoms.

[4] The triazine ring-containing polymer according to [3], wherein the fluorine atom-containing arylamino group is represented by formula (16) or (17),

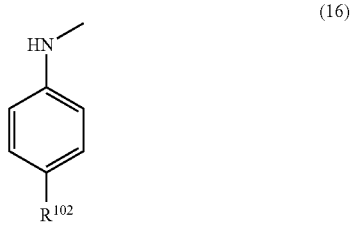

(16)

-continued (17)

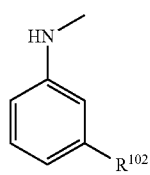

wherein $R^{102}$ is synonymous as above.

[5] The triazine ring-containing polymer according to [3] or [4], wherein $R^{102}$ represents a perfluoroalkyl group having 1 to 10 carbon atoms.

[6] The triazine ring-containing polymer according any one of [1] to [5], wherein the arylamino group having crosslinking group is represented by formula (18), (18)

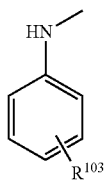

wherein $R^{103}$ represents a crosslinking group.

[7] The triazine ring-containing polymer according to [6], wherein the arylamino group having crosslinking group is represented by formula (19), (19)

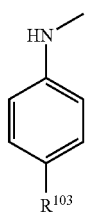

wherein $R^{103}$ is synonymous as above.

[8] The triazine ring-containing polymer according to any one of [1] to [7], wherein the crosslinking group is a hydroxy-containing group or a (meth)acryloyl-containing group.

[9] The triazine ring-containing polymer according to [8], wherein the crosslinking group is a hydroxyalkyl group, a (meth)acryloyloxyalkyl group, or a group represented by formula (i) below, (i)

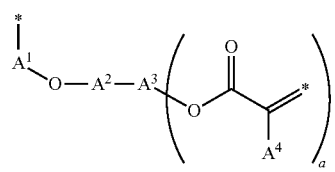

wherein $A^1$ represents an alkylene group having 1 to 10 carbon atoms, and $A^2$ represents a single bond or a group represented by formula (j) below, (j)

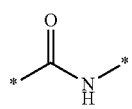

wherein $A^3$ represents a divalent or trivalent aliphatic hydrocarbon group optionally substituted with hydroxy group, $A^4$ represents a hydrogen atom or a methyl group, a represents 1 or 2, and * represents a site of bonding.

[10] The triazine ring-containing polymer according to [9], wherein the crosslinking group is one or more groups selected from hydroxymethyl group, 2-hydroxyethyl group, (meth)acryloyloxymethyl group, (meth)acryloyloxyethyl group, and groups represented by formulae (i-2) to (i-5) below, (i-2)

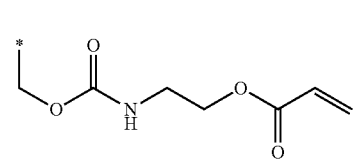

(i-3)

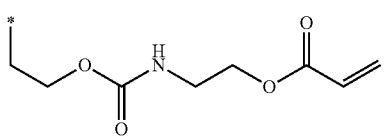

(i-4)

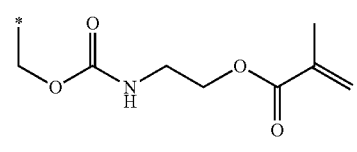

(i-5)

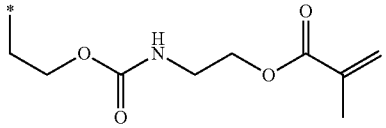

wherein * represents a site of bonding.

[11] The triazine ring-containing polymer according to any one of [1] to [10], wherein Ar is represented by formula (20) or (21).

(20)

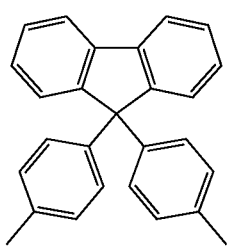

(21)

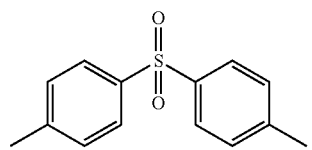

[12] A film-forming composition that contains the triazine ring-containing polymer according to any one of [1] to [11], and an organic solvent.

[13] The film-forming composition according to [12], wherein the organic solvent contains at least one selected from glycol ester-based solvent, ketone-based solvent, and ester-based solvent.

[14] The film-forming composition according to [12] or [13], further containing a crosslinking agent.

[15] The film-forming composition according to [14], wherein the crosslinking agent is a polyfunctional (meth) acrylic compound.

[16] A film obtained from the film-forming composition according to any one of [12] to [15].

[17] An electronic device including a base, and the film according to [16] formed on the base.

[18] An optical component including a base, and the film according to [16] formed on the base.

Advantageous Effects of Invention

The present invention can provide a triazine ring-containing polymer capable of forming a film that has high refractive index and excels in transparency and solvent resistance, and is highly soluble in various organic solvents such as low-polarity solvent, hydrophobic solvent, and low-boiling point solvent.

Although introduction of fluorine atom into a compound has been known to often decrease the refractive index thereof, the triazine ring-containing polymer of the present invention maintains high refractive index despite the introduction of fluorine atom.

With use of the triazine ring-containing polymer of the present invention, it now becomes possible to prepare the composition by using an organic solvent with low solubilizing power, such as low-polarity solvent or hydrophobic solvent, enabling formation of a film without problem even on a base susceptible to erosion with high polarity solvent.

Since the thin film formed of the composition for film formation of the present invention can demonstrate characteristics including high heat resistance, high refractive index, low volume shrinkage, and solvent resistance (crack resistance), the thin film is therefore suitably applicable to the fields of electronic devices and optical materials, when manufacturing a part of liquid crystal display, an organic EL element (organic EL display or organic EL lighting), touch panel, optical semiconductor (LED) element, solid-state image sensor, organic thin-film solar cell, dye-sensitized solar cell, organic thin-film transistor (TFT), lens, prism, camera, binoculars, microscope, semiconductor exposure apparatus, and the like.

In particular, the film formed of the film-forming composition of the present invention demonstrates high transparency and excels in refractive index and solvent resistance (crack resistance), and can therefore improve, when applied to a planarization layer or a light scattering layer of organic EL lighting, the light extraction efficiency (light diffusion efficiency) and the durability thereof.

DESCRIPTION OF EMBODIMENTS

Figure 1:
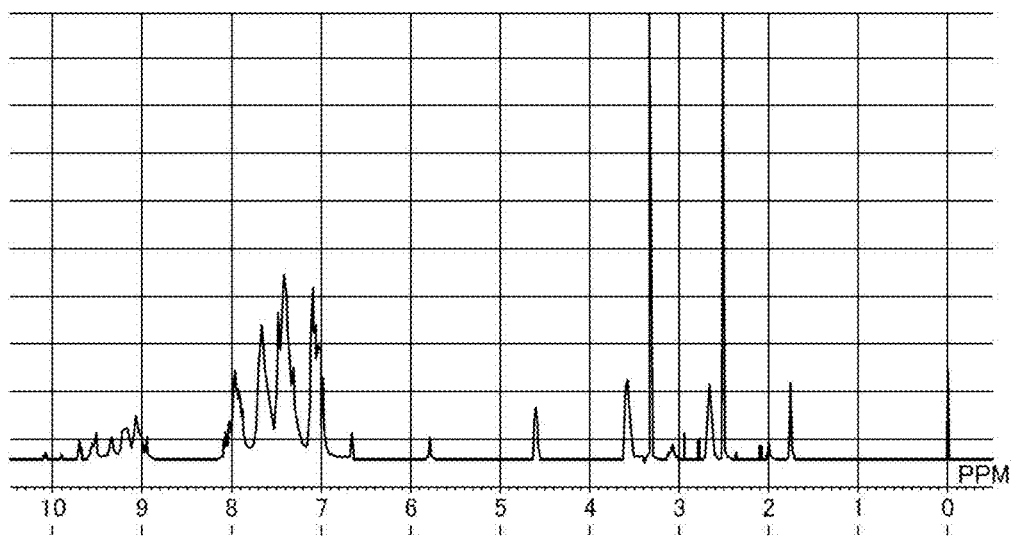
FIG. 1 is a $^1$H-NMR spectral chart of polymer compound [5] obtained in Example 1-1.

The present invention will further be detailed.

The triazine ring-containing polymer of the present invention contains a repeating unit structure represented by formula (1) below.

The triazine ring-containing polymer is typically a so-called hyperbranched polymer. The hyperbranched polymer is a highly branched polymer having an irregular branched structure. The term "irregular" as used herein means that it is more irregular than the branched structure of a dendrimer which is a highly branched polymer having a regular branched structure.

For example, the triazine ring-containing polymer, being a hyperbranched polymer, includes a structure (structure A) having the repeating unit structure represented by formula (1) bound to each of three bonds of the repeating unit structure represented by the formula (1), which is contained as a structure larger than the repeating unit structure represented by formula (1). In the triazine ring-containing polymer, being a hyperbranched polymer, the structure A is distributed throughout, but excluding the terminal of, the triazine ring-containing polymer.

In the triazine ring-containing polymer, being a hyperbranched polymer, the repeating unit structure may be substantially composed only of the repeating unit structure represented by formula (1).

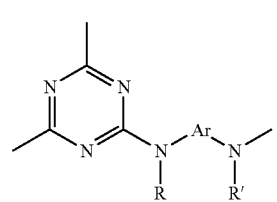

(1)

In the formula, each of R and R' independently represents a hydrogen atom, an alkyl group, an alkoxy group, an aryl group, or an aralkyl group, wherein both of them preferably represent hydrogen atom from the viewpoint of further increasing the refractive index.

In the present invention, the number of carbon atoms of the alkyl group is preferably, but not specifically limited to, 1 to 20. In consideration of further enhancing the heat resistance of the polymer, the number of carbon atoms of the alkyl group is more preferably 1 to 10, and even more preferably 1 to 3. The structure of the alkyl group is not particularly limited, and may typically be chain-like, branched, cyclic, or combinations of two or more of them.

The alkyl group is specifically exemplified by methyl, ethyl, n-propyl, isopropyl, cyclopropyl, n-butyl, isobutyl, s-butyl, t-butyl, cyclobutyl, 1-methyl-cyclopropyl, 2-methyl-cyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methyl-cyclobutyl, 2-methyl-cyclobutyl, 3-methyl-cyclobutyl, 1,2-dimethyl-cyclopropyl, 2,3-dimethyl-cyclopropyl, 1-ethyl-cyclopropyl, 2-ethyl-cyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methyl-cyclopentyl, 2-methyl-cyclopentyl, 3-methyl-cyclopentyl, 1-ethyl-cyclobutyl, 2-ethyl-cyclobutyl, 3-ethyl-cyclobutyl, 1,2-dimethyl-cyclobutyl, 1,3-dimethyl-cyclobutyl, 2,2-dimethyl-cyclobutyl, 2,3-dimethyl-cyclobutyl, 2,4-dimethyl-cyclobutyl, 3,3-dimethyl-cyclobutyl, 1-n-propyl-cyclopropyl, 2-n-propyl-cyclopropyl, 1-isopropyl-cyclopropyl, 2-isopropyl-cyclopropyl, 1,2,2-trimethyl-cyclopropyl, 1,2,3-trimethyl-cyclopropyl, 2,2,3-trimethyl-cyclopropyl, 1-ethyl-2 methyl-cyclopropyl, 2-ethyl-1-methyl-cyclopropyl, 2-ethyl-2-methyl-cyclopropyl, and 2-ethyl-3-methyl-cyclopropyl groups.

The number of carbon atoms of the alkoxy group is preferably, but not specifically limited to, 1 to 20. In consideration of further enhancing the heat resistance of the polymer, the number of carbon atoms of the alkoxy group is more preferably 1 to 10, and even more preferably 1 to 3. The structure of the alkyl moiety is not particularly limited, and may typically be chain-like, branched, cyclic, or combinations of two or more of them.

The alkoxy group is specifically exemplified by methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy, and 1-ethyl-2-methyl-n-propoxy groups.

The number of carbon atoms of the aryl group is preferably, but not specifically limited to, 6 to 40. In consideration of further enhancing the heat resistance of the polymer, the number of carbon atoms of the aryl group is more preferably 6 to 16, and even more preferably 6 to 13.

In the present invention, the aryl group includes aryl group having a substituent. The substituent is exemplified by halogen atom, alkyl group having 1 to 6 carbon atoms, alkoxy group having 1 to 6 carbon atoms, nitro group, and cyano group.

The aryl group is specifically exemplified by phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl, and 9-phenanthryl groups.

The number of carbon atoms of the aralkyl group is preferably, but not specifically limited to, 7 to 20. The structure of the alkyl moiety is not particularly limited, and may typically be straight chain-like, branched, cyclic, or combinations of two or more thereof.

In the present invention, the aralkyl group includes aralkyl group having a substituent. The substituent is exemplified by halogen atom, alkyl group having 1 to 6 carbon atoms, alkoxy group having 1 to 6 carbon atoms, nitro group, and cyano group.

Specific examples thereof include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl, and an α-naphthylmethyl groups.

The Ar represents at least one group selected from those represented by formulae (2) to (13).

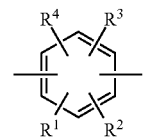
(2)

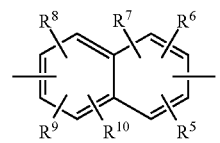
(3)

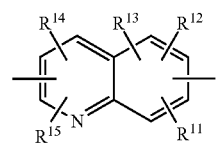
(4)

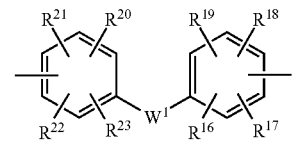
(5)

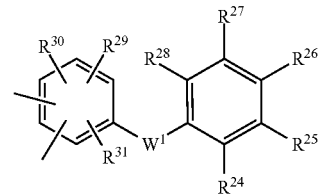
(6)

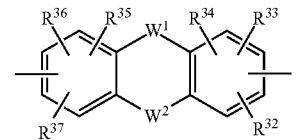
(7)

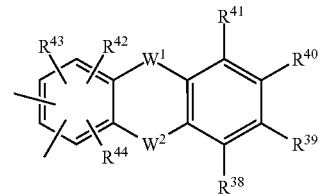
(8)

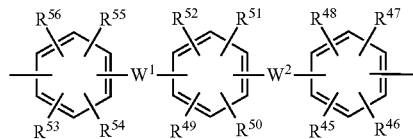
(9)

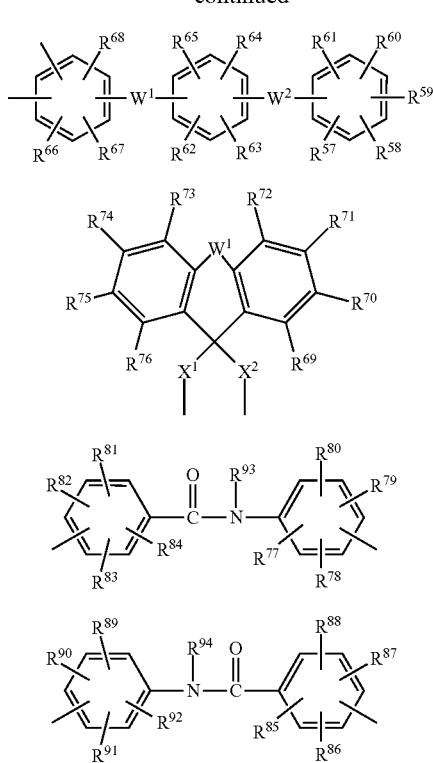

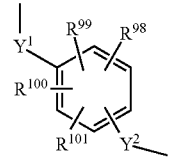

Each of $R^1$ to $R^{92}$ independently represents a hydrogen atom, a halogen atom, a carboxy group, a sulfo group, an alkyl group having 1 to 10 carbon atoms, a halogenated alkyl group having 1 to 10 carbon atoms, or an alkoxy group having 1 to 10 carbon atoms, each of $R^{93}$ and $R^{94}$ represents a hydrogen atom or an alkyl group having 1 to 10 carbon atoms, and each of $W^1$ and $W^2$ independently represents a single bond, $CR^{95}R^{96}$ (each of $R^{95}$ and $R^{96}$ independently represent a hydrogen atom or an alkyl group having 1 to 10 carbon atoms (where, they may form a ring together)), C=O, O, S, SO, $SO_2$, or $NR^{97}$ ($R^{97}$ represents a hydrogen atom, an alkyl group having 1 to 10 carbon atoms, or a phenyl group).

The halogen atom is exemplified by fluorine atom, chlorine atom, bromine atom, and iodine atom.

The alkyl group and the alkoxy group may be exemplified by those similar to the alkyl group and the alkoxy group represented by R and R'.

The halogenated alkyl group having 1 to 10 carbon atoms results from substitution of at least one hydrogen atom in the alkyl group having 1 to 10 carbon atoms with halogen atom, and is specifically exemplified by trifluoromethyl, 2,2,2-trifluoroethyl, perfluoroethyl, 3,3,3-trifluoropropyl, 2,2,3,3,3-pentafluoropropyl, 2,2,3,3-tetrafluoropropyl, 2,2,2-trifluoro-1-(trifluoromethyl)ethyl, perfluoropropyl, 4,4,4-trifluorobutyl, 3,3,4,4,4-pentafluorobutyl, 2,2,3,3,4,4,4-heptafluorobutyl, perfluorobutyl, 2,2,3,3,4,4,5,5,5-nonafluoropentyl, 2,2,3,3,4,4,5,5-octafluoropentyl, perfluoropentyl, 2,2,3,3,4,4,5,5,6,6,6-undecafluorohexyl, 2,2,3,3,4,4,5,5,6,6-decafluorohexyl, 3,3,4,4,5,5,6,6,6-nonafluorohexyl, and perfluorohexyl groups.

Each of $X^1$ and $X^2$ independently represents a single bond, an alkylene group having 1 to 10 carbon atoms, or a group represented by formula (14).

The structures of these alkyl group, halogenated alkyl group, alkoxy group and alkylene group are not specifically limited, and may typically be chain-like, branched, cyclic, or combinations of two or more of them.

Each of $R^{98}$ to $R^{101}$ independently represents a hydrogen atom, a halogen atom, a carboxy group, a sulfo group, an alkyl group having 1 to 10 carbon atoms, a halogenated alkyl group having 1 to 10 carbon atoms, or an alkoxy group having 1 to 10 carbon atoms, and each of $Y^1$ and $Y^2$ independently represents a single bond or an alkylene group having 1 to 10 carbon atoms. These halogen atom, alkyl group, halogenated alkyl group, and alkoxy group are exemplified by those similar to halogen atom, alkyl group, halogenated alkyl group, alkoxy group represented by $R^1$ to $R^{92}$.

The alkylene group having 1 to 10 carbon atoms is exemplified by methylene, ethylene, propylene, trimethylene, tetramethylene, and pentamethylene groups.

The structure of the alkyl group is not particularly limited, and may typically be chain-like, branched, cyclic, or combinations of two or more of them.

Among them, each of $R^1$ to $R^{92}$ and $R^{98}$ to $R^{101}$ preferably represents a hydrogen atom, a halogen atom, a sulfo group, an alkyl group having 1 to 5 carbon atoms, a halogenated alkyl group having 1 to 5 carbon atoms, or an alkoxy group having 1 to 5 carbon atoms, wherein a hydrogen atom is more preferred.

In particular, Ar preferably represents at least one group represented by formulae (2), and (5) to (13), and more preferably represents at least one group represented by formulae (2), (5), (7), (8), and (11) to (13). The aryl group represented by formulae (2) to (13) are specifically exemplified by, but not limited to, those represented by the formulae below.

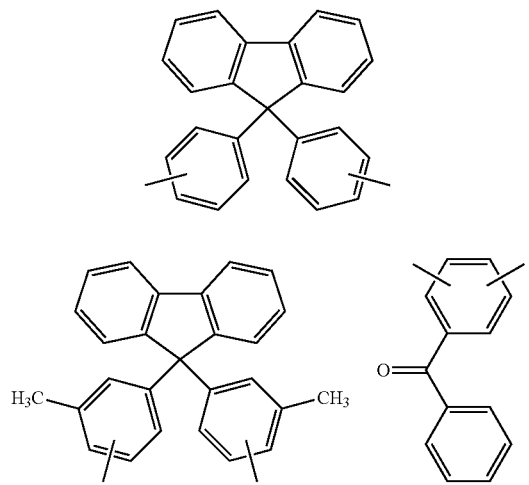

-continued
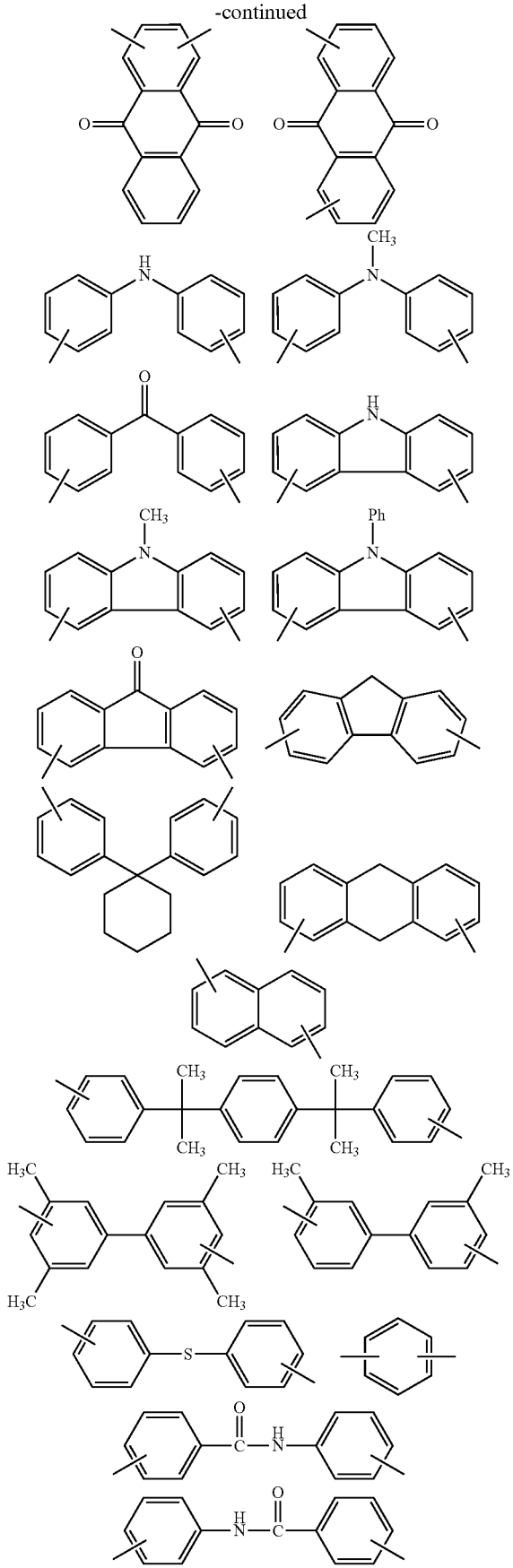
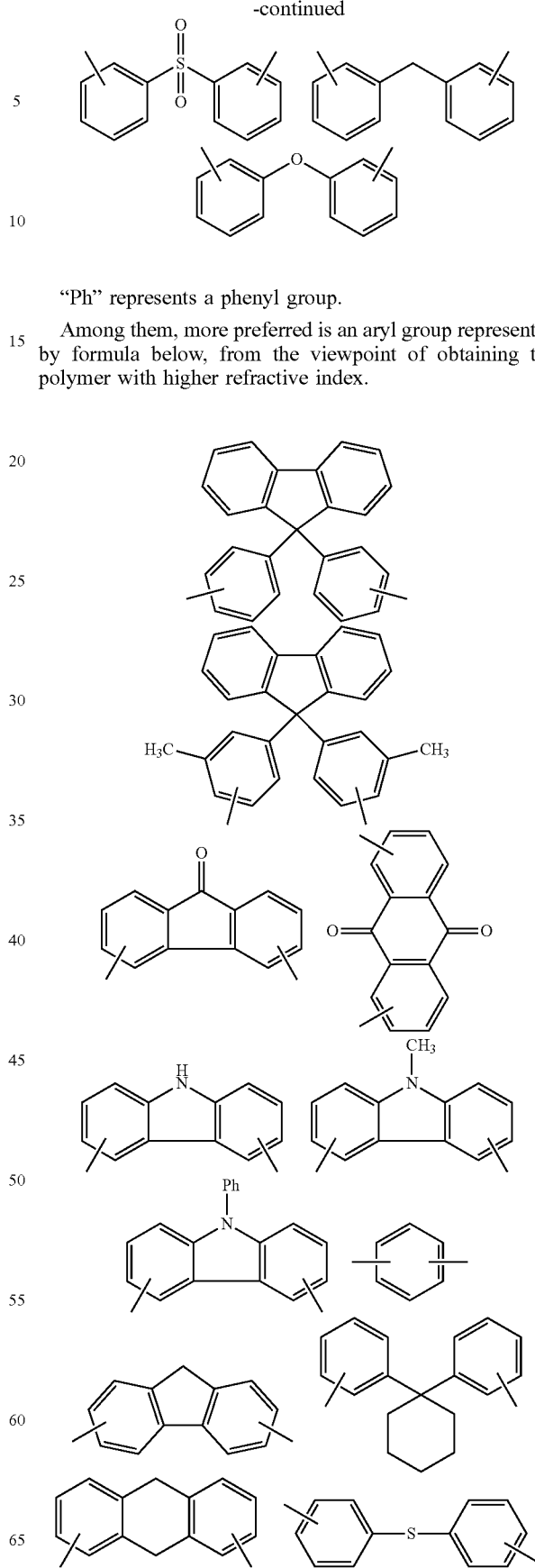
"Ph" represents a phenyl group.
Among them, more preferred is an aryl group represented by formula below, from the viewpoint of obtaining the polymer with higher refractive index.

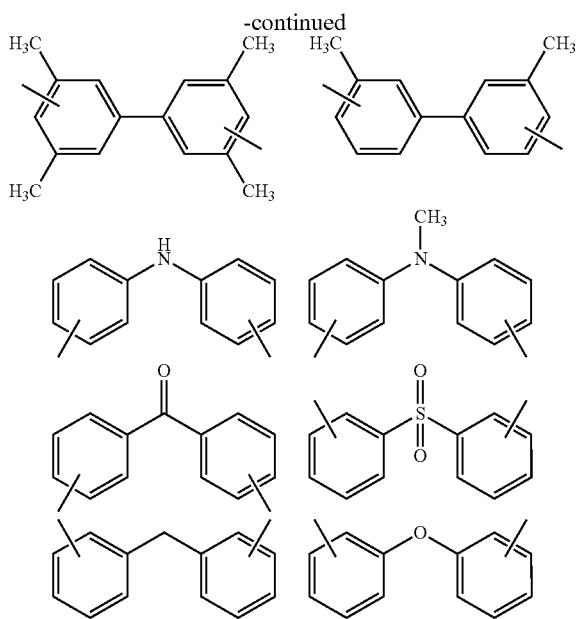

"Ph" represents a phenyl group.

In particular, considering further enhancement of the refractive index and heat resistance of the triazine ring-containing polymer, Ar preferably represents a group having a fluorene skeleton represented by formula (20), or having a diphenylsulfone skeleton represented by formula (21).

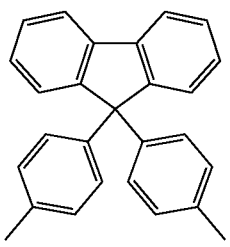

(20)

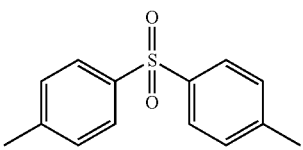

(21)

The triazine ring-containing polymer of the present invention has at least one triazine ring terminal, and at least a part of the triazine ring terminal is blocked with a fluorine atom-containing arylamino group, and with an arylamino group having crosslinking group.

The triazine ring-containing polymer of the present invention has at least one triazine ring terminal, and such triazine ring at the terminal usually has two halogen atoms which can be substituted with the fluorine atom-containing arylamino group, or with the arylamino group having crosslinking group. Hence, the fluorine atom-containing arylamino group and the arylamino group having crosslinking group may be bonded to the same triazine ring terminal, or may alternatively be bonded to different triazine ring terminals if there are a plurality of triazine ring terminals.

That is, "at least a part of the triazine ring terminals is blocked with a fluorine atom-containing arylamino group and with an arylamino group having crosslinking group" includes both of the cases where the fluorine atom-containing arylamino group and the arylamino group having crosslinking group are bonded to the same triazine ring terminal, and the case where the fluorine atom-containing arylamino group and the arylamino group having crosslinking group are individually bonded to different triazine ring terminals.

The aryl group, in each of the fluorine atom-containing arylamino group and the arylamino group having crosslinking group, is exemplified by the groups same as those described above, for which phenyl group is particularly preferred.

The crosslinking group is bonded to the aryl group.

The fluorine atom-containing arylamino group is an arylamino group having fluorine atom-containing group. The fluorine atom-containing group is bonded to the aryl group.

The fluorine atom-containing group is exemplified by fluorine atom, and fluorine atom-containing hydrocarbon group such as fluoroalkyl group, wherein preferred are fluorine atom and fluoroalkyl group having 1 to 10 carbon atoms.

The fluoroalkyl group having 1 to 10 carbon atoms may typically be straight chain-like, branched, cyclic, and combination of two or more of them without special limitation, and is exemplified by trifluoromethyl, pentafluoroethyl, 2,2,2-trifluoroethyl, heptafluoropropyl, 2,2,3,3,3-pentafluoropropyl, 2,2,3,3-tetrafluoropropyl, 2,2,2-trifluoro-1-(trifluoromethyl)ethyl, nonafluorobutyl, 4,4,4-trifluorobutyl, undecafluoropentyl, 2,2,3,3,4,4,5,5,5-nonafluoropentyl, 2,2,3,3,4,4,5,5-octafluoropentyl, tridecafluorohexyl, 2,2,3,3,4,4,5,5,6,6-undecafluorohexyl, 2,2,3,3,4,4,5,5,6,6-decafluorohexyl, and 3,3,4,4,5,5,6,6,6-nonafluorohexyl groups.

In particular, considering enhancement of the solubility of the triazine ring-containing polymer typically in low-polarity solvent while maintaining the refractive index, particularly preferred is perfluoroalkyl group having 1 to 10 carbon atoms, more preferred is perfluoroalkyl group having 1 to 5 carbon atoms, and most preferred is trifluoromethyl group.

Although the number of fluorine atom-containing group in the fluorine atom-containing arylamino group is freely selectable without special limitation within a possibly largest number of substitution on the aryl group, the number is preferably 1 to 4, in consideration of the balance between maintenance of the refractive index and solubility in the solvent, which is more preferably 1 or 2, and even more preferably 1.

The crosslinking group is exemplified by hydroxy-containing group, vinyl-containing group, epoxy-containing group, oxetane-containing group, carboxy-containing group, sulfo-containing group, thiol-containing group, and (meth)acryloyl-containing group, among which hydroxy-containing group and (meth)acryloyl-containing group are preferred, in consideration of improving heat resistance of the triazine ring-containing polymer, and solvent resistance (crack resistance) of the obtainable film.

The hydroxy-containing group is exemplified by hydroxy group and hydroxyalkyl group, among which hydroxyalkyl group having 1 to 10 carbon atoms is preferred, hydroxyalkyl group having 1 to 5 carbon atoms is more preferred, and hydroxyalkyl group having 1 to 3 carbon atoms is even more preferred.

The hydroxyalkyl group having 1 to 10 carbon atoms is exemplified by those having a hydroxy group bonded to a primary carbon atom, such as hydroxymethyl, 2-hydroxyethyl, 3-hydroxypropyl, 4-hydroxybutyl, 5-hydroxypentyl, 6-hydroxyhexyl, 7-hydroxyheptyl, 8-hydroxyoctyl, 9-hydroxynonyl, 10 hydroxydecyl, 2-hydroxy-1-methylethyl, 2-hydroxy-1,1-dimethylethyl, 3-hydroxy-1-methylpropyl, 3-hydroxy-2-methylpropyl, 3-hydroxy-1,1-dimethylpropyl, 3-hydroxy-1,2-dimethylpropyl, 3-hydroxy-2,2-dimethylpropyl, 4-hydroxy-1-methylbutyl, 4-hydroxy-2-methylbutyl, and 4-hydroxy-3-methylbutyl groups; and those having a hydroxy group bonded to a secondary or tertiary carbon atoms, such as 1-hydroxyethyl, 1-hydroxypropyl, 2-hydroxypropyl, 1-hydroxybutyl, 2-hydroxybutyl, 1-hydroxyhexyl, 2-hydroxyhexyl, 1-hydroxyoctyl, 2-hydroxyoctyl, 1-hydroxydecyl, 2-hydroxydecyl, 1-hydroxy-1-methylethyl, and 2-hydroxy-2 methylpropyl groups.

In particular, in consideration of improving heat resistance and hot-humid resistance, preferred are those having a hydroxy group bonded to a primary carbon atom, among which preferred is hydroxyalkyl group having 1 to 5 carbon atoms, more preferred is hydroxyalkyl group having 1 to 3 carbon atoms, even more preferred are hydroxymethyl group and 2-hydroxyethyl group, and most preferred is 2-hydroxyethyl group.

The (meth)acryloyl-containing group is exemplified by (meth)acryloyl group, (meth)acryloyloxyalkyl group, and group represented by formula (i) below, among which preferred are (meth)acryloyloxyalkyl group having an alkylene group having 1 to 10 carbon atoms, and the group represented by formula (i) below, and more preferred is the group represented by formula (i) below.

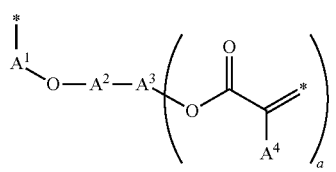

(i)

wherein $A^1$ represents an alkylene group having 1 to 10 carbon atoms, and $A^2$ represents a single bond or a group represented by formula (j) below,

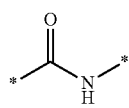

(j)

wherein $A^3$ represents a divalent or trivalent aliphatic hydrocarbon group optionally substituted with hydroxy group, $A^4$ represents a hydrogen atom or a methyl group, a represents 1 or 2, and * represents a site of bonding.

The alkylene group contained in the (meth)acryloyloxyalkyl group having alkylene group (alkanediyl group) having 1 to 10 carbon atoms is exemplified by methylene, ethylene, trimethylene, propane-1,2-diyl, tetramethylene, butane-1,3-diyl, butane-1,2-diyl, 2-methylpropane-1,3-diyl, pentamethylene, hexamethylene, heptamethylene, octamethylene, nonamethylene, decimethylenemethyl, ethyl, n-propyl, isopropyl, n-butyl, isobutyl, s-butyl, t-butyl, n-pentyl, n-hexyl, n-heptyl, n-octyl, n-nonyl, and n-decyl groups. Among them, those having an alkylene group having 1 to 5 carbon atoms are preferred, in consideration of improving heat resistance and hot-humid resistance, those having an alkylene group having 1 to 3 carbon atoms are more preferred, and those having an alkylene group having 1 or 2 carbon atoms are even more preferred.

The (meth)acryloyloxyalkyl group is specifically exemplified by (meth)acryloyloxymethyl group, 2-(meth)acryloyloxyethyl group, 3-(meth)acryloyloxypropyl group, and 4-(meth)acryloyloxybutyl group.

In formula (i), $A^1$ represents an alkylene group having 1 to 10 carbon atoms, preferably represents an alkylene group having 1 to 5 carbon atoms, and more preferably represents a methylene group or an ethylene group. The alkylene group having 1 to 10 carbon atoms is exemplified by alkylene groups same as those contained in the aforementioned (meth)acryloyloxyalkyl group.

$A^2$ Represents a single bond or a group represented by formula (j), among which a group represented by formula (j) is preferred.

$A^3$ represents a divalent or trivalent aliphatic hydrocarbon group optionally substituted with hydroxy group, and is specifically exemplified by alkylene group having 1 to 5 carbon atoms, and a group represented by formulae (k-1) to (k-3) below:

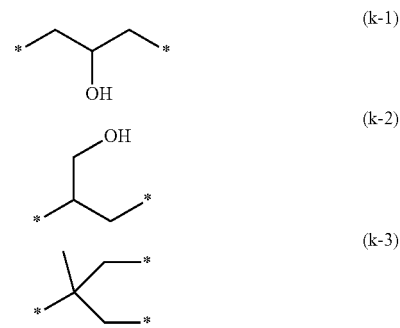

(k-1)

(k-2)

(k-3)

wherein * is synonymous as above.

Among which alkylene group having 1 to 5 carbon atoms is preferred, alkylene group having 1 to 3 carbon atoms is more preferred, and methylene group and ethylene group are even more preferred. The alkylene group represented by $A^3$ is exemplified by alkylene group having 1 to 5 carbon atoms, from among the alkylene groups exemplified for $A^1$.

a Represents 1 or 2, wherein 1 is preferred.

Preferred embodiments of the group represented by formula (i) are exemplified by those represented by formula (i-1) below.

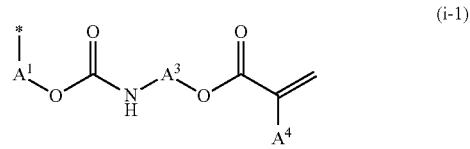

(i-1)

wherein $A^1$, $A^3$, $A^4$ and * are synonymous as above.

More preferred embodiments of the group represented by formula (i) are exemplified by those represented by formulae (i-2) to (i-5) below.

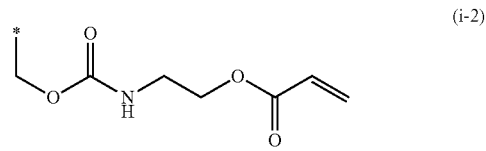

(i-2)

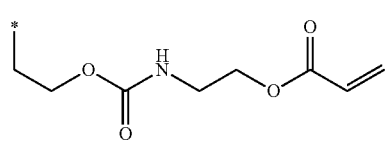
(i-3)

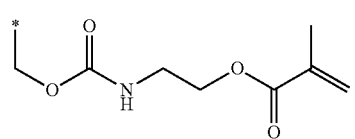
(i-4)

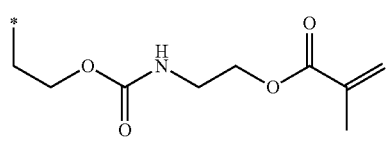
(i-5)

wherein * is synonymous as above.

The vinyl-containing group is exemplified by alkenyl group having 2 to 10 carbon atoms, and having a vinyl group at the terminal. Specific examples include ethenyl, 1-propenyl, allyl, isopropenyl, 1-butenyl, 2-butenyl, and 2-pentenyl groups.

The epoxy-containing group is exemplified by epoxy, glycidyl, and glycidyloxy groups. Specific examples include glycidylmethyl, 2-glycidylethyl, 3-glycidylpropyl, and 4-glycidylbutyl groups.

The oxetane-containing group is exemplified by oxetane-3-yl, (oxetane-3-yl)methyl, 2-(oxetane-3-yl)ethyl, 3-(oxetane-3-yl)propyl, and 4-(oxetane-3-yl)butyl groups.

The carboxy-containing group is exemplified by carboxy group and carboxyalkyl group having 2 to 10 carbon atoms. The carboxyalkyl group having 2 to 10 carbon atoms is preferably any of those having a carboxy group bonded to a primary carbon atom, and is specifically exemplified by carboxymethyl, 2-carboxyethyl, 3-carboxypropyl, and 4-carboxybutyl groups.

The sulfo-containing group is exemplified by sulfo group, and sulfoalkyl group having 1 to 10 carbon atoms. The sulfoalkyl group having 1 to 10 carbon atoms is preferably any of those having a sulfo group bonded to a primary carbon atom, and is specifically exemplified by sulfomethyl, 2-sulfoethyl, 3-sulfopropyl, and 4-sulfobutyl groups.

The thiol-containing group is exemplified by thiol group, and mercaptoalkyl group having 1 to 10 carbon atoms. The mercaptoalkyl group having 1 to 10 carbon atoms is preferably any of those having a thiol group bonded to a primary carbon atom, and is specifically exemplified by mercaptomethyl, 2-mercaptoethyl, 3-mercaptopropyl, and 4-mercaptobutyl groups.

Although the number of crosslinking group in the arylamino group having crosslinking group is freely selectable without special limitation within a possibly largest number of substitution on the aryl group, the number is preferably 1 to 4, in consideration of the balance between solvent resistance and solubility in solvent, which is more preferably 1 or 2, and even more preferably 1.

Preferred fluorine atom-containing arylamino group is exemplified by a group represented by formula (15), and is particularly preferably exemplified by a group represented by formula (16) having a fluorine atom-containing group at the para-position, or a group represented by formula (17) having a fluorine atom-containing group at the meta-position, relative to the amino group.

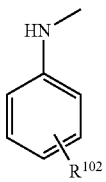
(15)

wherein $R^{102}$ represents a fluorine atom or a fluoroalkyl group having 1 to 10 carbon atoms.

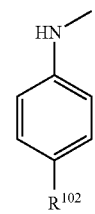
(16)

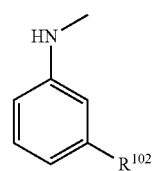
(17)

wherein $R^{102}$ is synonymous as above.

The fluorine atom-containing arylamino group is specifically exemplified by, but not limited to, those represented by formulae below.

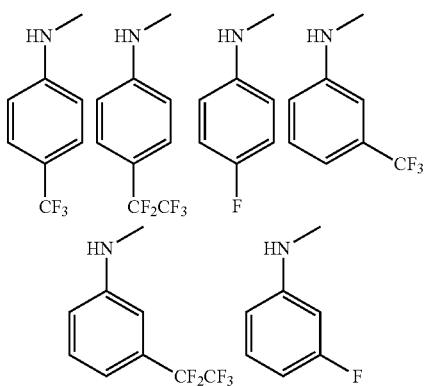

The fluorine atom-containing arylamino group may be introduced with use of a corresponding fluorine atom-containing arylamino compound, by a method of production described later.

The fluorine atom-containing arylamino compound is specifically exemplified by 4-fluoroaniline, 4-trifluoromethylaniline, and 4-pentafluoroethylaniline.

Preferred arylamino group having crosslinking group is exemplified by a group represented by formula (18), and is particularly preferably exemplified by a group represented by formula (19) having a crosslinking group at the para-position relative to the amino group.

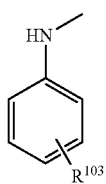
wherein $R^{103}$ represents a crosslinking group.
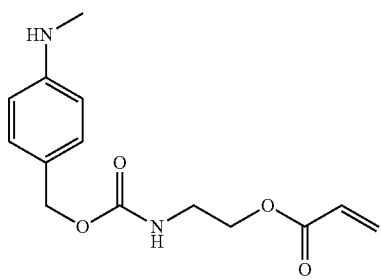
wherein $R^{103}$ is synonymous as above.
The arylamino group having crosslinking group is specifically exemplified by, but not limited to, those represented by the formulae below.
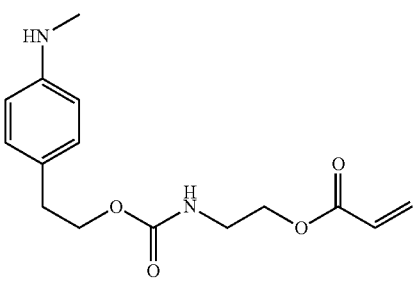
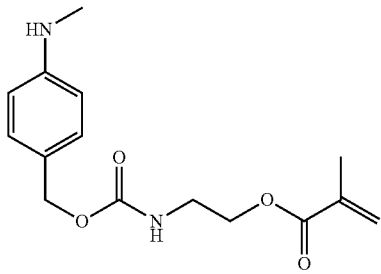
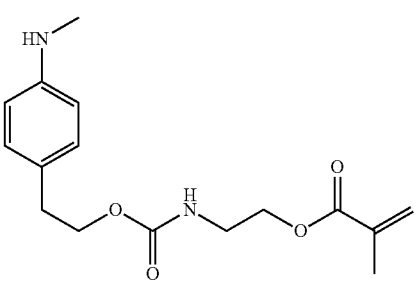
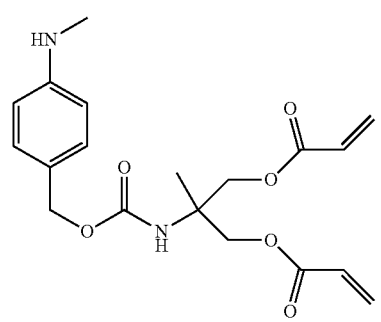
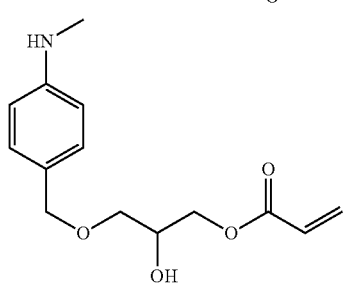

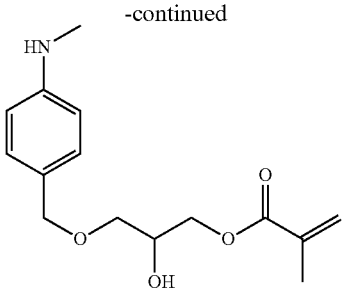

The arylamino group having hydroxyalkyl group can be introduced by using a corresponding hydroxyalkyl group-substituted arylamino compound, by a method of production described later.

The hydroxyalkyl group-substituted arylamino compound is exemplified by (4-aminophenyl)methanol and 2-(4-aminophenyl)ethanol.

The arylamino group having (meth)acryloyloxyalkyl group can be introduced by a method that uses a corresponding (meth)acryloyloxyalkyl group-substituted arylamino compound; or by a method in which an arylamino group having hydroxyalkyl group is introduced into the triazine ring-containing polymer, and then (meth)acrylic acid halide or glycidyl (meth)acrylate is further allowed to act on the hydroxy group contained in the hydroxyalkyl group.

The arylamino group having the group represented by formula (i) can be introduced by a method that uses an arylamino compound having an intended crosslinking group; or by a method in which an arylamino group having hydroxyalkyl group is introduced into the triazine ring-containing polymer, and then (meth)acrylate ester compound having isocyanate group, represented by formula (i') below, is further allowed to act on the hydroxy group contained in the hydroxyalkyl group.

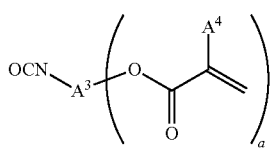

wherein $A^3$, $A^4$ and a are synonymous as above.

The (meth)acryloyloxyalkyl group-substituted arylamino compound is specifically exemplified by ester compound obtainable by allowing (meth)acrylic acid halide or glycidyl (meth)acrylate to act on the hydroxy group of the hydroxyalkyl group-substituted arylamino compound.

The (meth)acrylic acid halide is exemplified by (meth)acryloyl chloride, (meth)acryloyl bromide, and (meth)acryloyl iodide.

The (meth)acrylate ester compound having isocyanate group, represented by formula (i'), is exemplified by 2-isocyanatoethyl acrylate, 2-isocyanatoethyl methacrylate, and 1,1-(bisacryloyloxymethyl)ethyl isocyanate.

In the present invention, particularly preferred triazine ring-containing polymer is exemplified by those containing repeating units represented by formulae (22) to (25), and formulae (26) to (29) below.

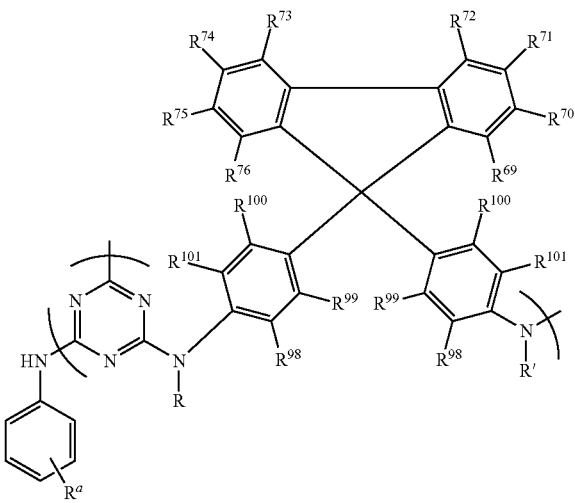

wherein $R^a$ represents $R^{102}$ or $R^{103}$, and R, R', $R^{69}$ to $R^{76}$, $R^{98}$ to $R^{101}$, $R^{102}$ and $R^{103}$ are synonymous as above.

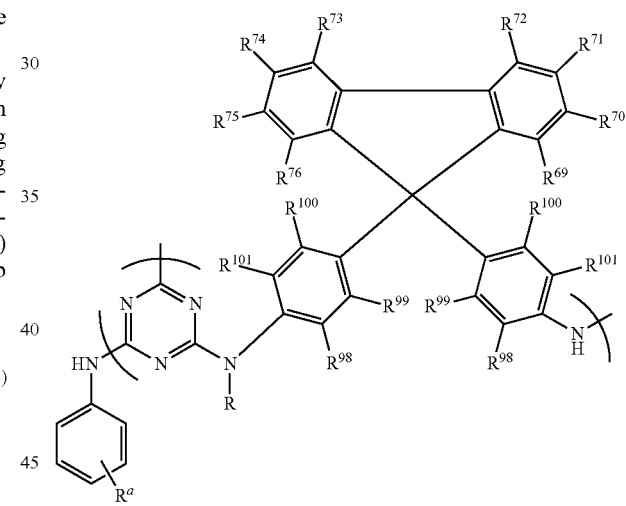

wherein $R^a$, $R^{69}$ to $R^{76}$, and $R^{98}$ to $R^{101}$ are synonymous as above.

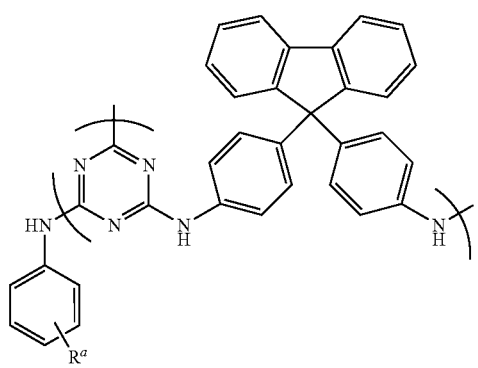

wherein $R^a$ is synonymous as above.

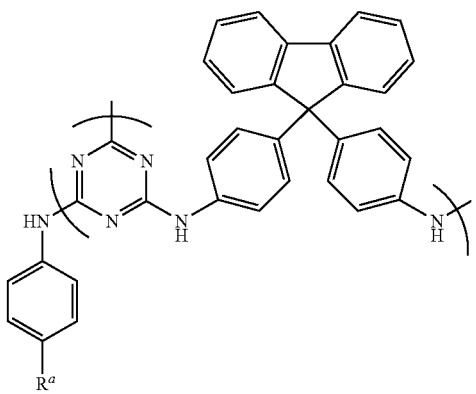

(25)

wherein R$^a$ is synonymous as above.

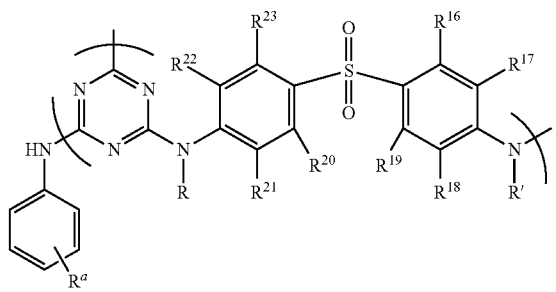

(26)

wherein R$^a$, R$^{16}$ to R$^{23}$, R and R' are synonymous as above.

(27)

wherein R$^a$, and R$^{16}$ to R$^{23}$ are synonymous as above.

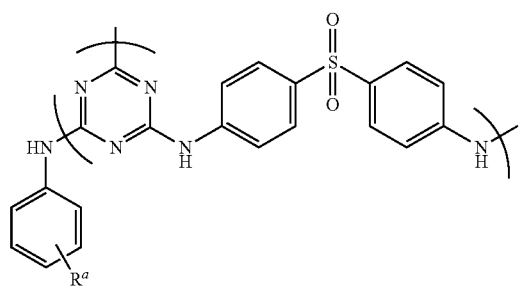

(28)

wherein R$^a$ is synonymous as above.

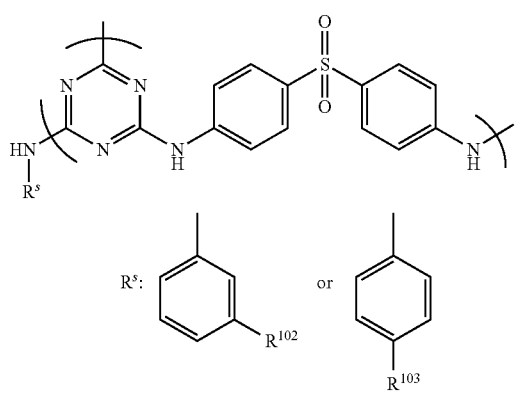

(29)

wherein R$^{102}$ and R$^{103}$ are synonymous as above.

The weight average molecular weight of the polymer in the present invention, although not particularly limited, is preferably 500 to 500,000, and more preferably 500 to 100,000, which is more preferably 2,000 or higher from the viewpoint of further improving the heat resistance and decreasing the shrinkage rate, meanwhile preferably 50,000 or lower, more preferably 30,000 or lower, even more preferably 10,000 or lower, from the viewpoint of further improving the solubility and of decreasing the viscosity of an obtainable solution.

The weight average molecular weight in the present invention is an average molecular weight in terms of standard polystyrene, obtainable by gel permeation chromatography (referred to as GPC, hereinafter).

The triazine ring-containing polymer of the present invention (hyperbranched polymer) may be produced referring to the method disclosed in WO 2010/128661.

That is, the triazine ring-containing polymer of the present invention is obtainable by reacting a trishalogenated triazine compound with an aryldiamino compound in an organic solvent, and then by further reacting typically with, as a terminal blocking agent, the fluorine atom-containing arylamino compound and at least one arylamino compound selected from arylamino compound having hydroxyalkyl group (hydroxy-containing group), arylamino compound having acryloyloxyalkyl group (acryloyl-containing group), and arylamino compound having group represented by formula (i) (acryloyl-containing group).

For example, as illustrated in scheme 1 below, the triazine ring-containing polymer (24) is obtainable by reacting the triazine compound (30) with an aryldiamino compound (31) in an appropriate organic solvent, and by further reacting with, as a terminal blocking agent, the fluorine atom-containing aniline compound and at least one arylamino compound (32) selected from the arylamino compound having hydroxyalkyl group, and the arylamino compound having the group represented by formula (i).

Scheme 1

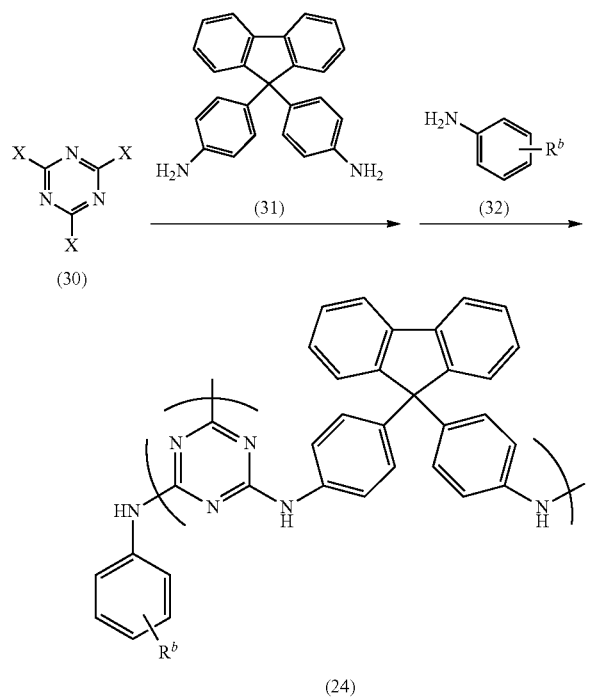

(24)

wherein each X independently represents a halogen atom, and $R^b$ represents a fluorine containing group, a hydroxyalkyl group, or a group represented by formula (i).

In the aforementioned reaction, loading ratio of the aryldiamino compound (31) is freely selectable so long as an intended polymer is obtainable, wherein the aryldiamino compound (31) preferably accounts for 0.01 to 10 equivalents per one equivalent of the triazine compound (30), and more preferably accounts for 0.7 to 5 equivalents.

The aryldiamino compound (31) may be added neat, or in the form of solution after dissolved in the organic solvent, wherein the latter technique is preferred in consideration of simplicity of operation and easiness of reaction control.

Reaction temperature may be suitably preset within the range from the melting point up to the boiling point of the solvent to be employed, which is preferably around −30 to 150° C., and more preferably around −10 to 100° C.

Another embodiment is exemplified by a technique illustrated in scheme 2 below. In this technique, the triazine ring-containing polymer (24) is obtainable by reacting the triazine compound (30) with the aryldiamino compound (31) in an appropriate organic solvent, and by further reacting with, as a terminal blocking agent, the fluorine atom-containing aniline compound and an arylamino compound (32') having hydroxyalkyl group, to obtain a triazine ring-containing polymer (24') (first stage); then by allowing a (meth)acrylate ester compound having isocyanate group represented by formula (i') to act on the hydroxy group of the hydroxyalkyl group contained in the triazine ring-containing polymer (24') (second stage).

In a case where the triazine ring-containing polymer (24') is desired as a final product, the scheme may be terminated upon completion of the first stage, without proceeding to the reaction in the second stage.

Scheme 2

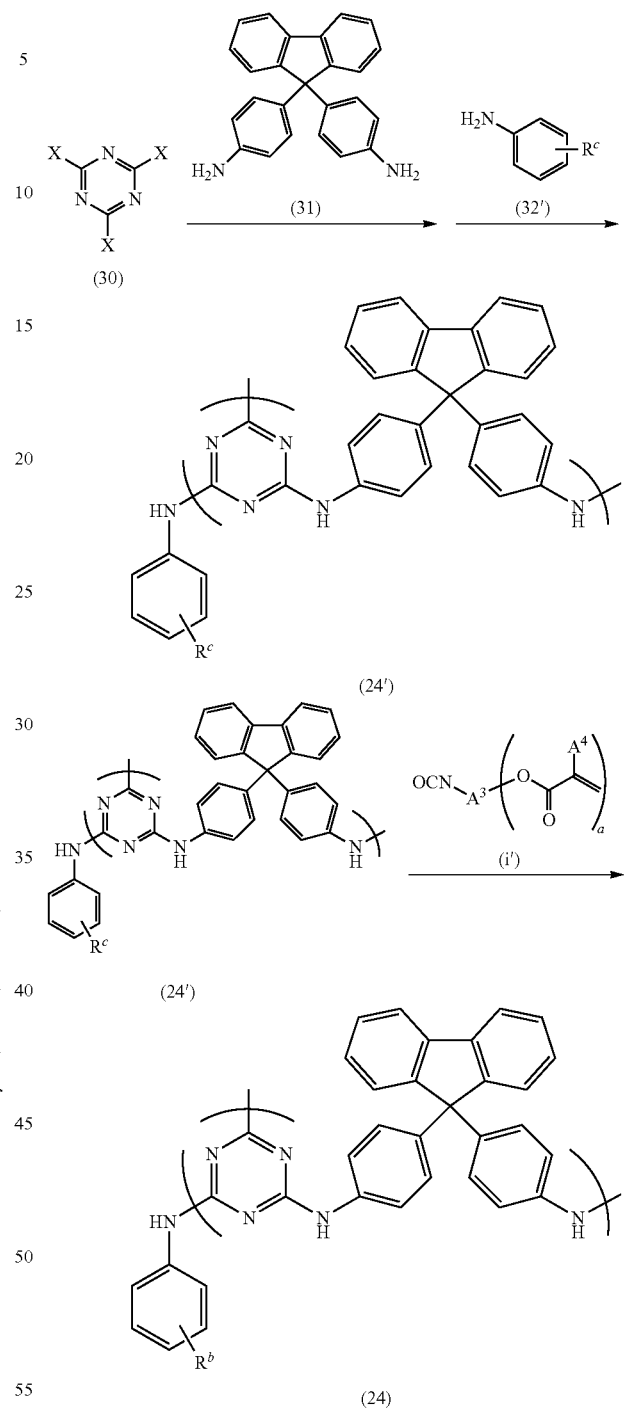

wherein $R^c$ represents a fluorine atom-containing group or a hydroxyalkyl group, and X, $A^3$, $A^4$, $R^b$ and a are synonymous as above.

In the aforementioned reaction, the loading ratio and the way of addition of the aryldiamino compound (31) in the first stage, and the reaction temperature throughout the reaction to obtain the triazine ring-containing polymer (24') may be similar to those described in scheme 1.

In the second stage, the loading ratio of the (meth)acrylate ester compound having isocyanate group represented by formula (i'), relative to the triazine ring-containing polymer (24'), may be freely selectable depending on the ratio of the hydroxyalkyl group to the group represented by formula (i), which is preferably 0.1 to 10 equivalents, more preferably 0.5 to 5 equivalents, even more preferably 0.7 to 3 equivalents, and yet more preferably 0.9 to 1.5 equivalents, per one equivalent of the arylamino compound having hydroxyalkyl group to be employed. Assuming now, for example, that all of the hydroxyalkyl groups contained in the triazine ring-containing polymer (24') were the groups represented by formula (i), the loading ratio of the (meth)acrylate ester compound, per one equivalent of the arylamino compound having hydroxyalkyl group to be employed, is preferably 1.0 to 10 equivalents, more preferably 1.0 to 5 equivalents, even more preferably 1.0 to 3 equivalents, and yet more preferably 1.0 to 1.5 equivalents.

Although the reaction temperature in the reaction may be equivalent to the reaction temperature in the reaction for obtaining the triazine ring-containing polymer (24'), the temperature is preferably 30 to 80° C. in consideration of preventing the (meth)acryloyl group from polymerizing during the reaction, more preferably 40 to 70° C., and even more preferably 50 to 60° C.

Still another embodiment is exemplified by a technique illustrated in scheme 3 below. In this technique, the triazine ring-containing polymer (28) is obtainable by reacting the triazine compound (30) with an aryldiamino compound (33) in an appropriate organic solvent, and by further reacting with, as a terminal blocking agent, the fluorine atom-containing aniline compound and at least one arylamino compound (32) selected from the arylamino compound having hydroxyalkyl group, and the arylamino compound having the group represented by formula (i).

lents per one equivalent of the triazine compound (30), and more preferably accounts for 0.7 to 5 equivalents.

The aryldiamino compound (33) may be added neat, or in the form of solution after dissolved in the organic solvent, wherein the latter technique is preferred in consideration of simplicity of operation and easiness of reaction control.

Reaction temperature may be suitably preset within the range from the melting point up to the boiling point of the solvent to be employed, which is preferably around −30 to 150° C., and more preferably around −10 to 100° C.

The organic solvent may be any of various solvents usually employed for this sort of reaction, and is exemplified by tetrahydrofuran (THF); dioxane; dimethyl sulfoxide; and amide-based solvents such as N,N-dimethylformamide, N-methyl-2-pyrrolidone, tetramethylurea, hexamethylphosphoramide, N,N-dimethylacetamide, N-methyl-2-piperidone, N,N-dimethylethyleneurea, N,N,N',N'-tetramethylmalonic acid amide, N-methylcaprolactam, N-acetylpyrrolidine, N,N-diethylacetamide, N-ethyl-2-pyrrolidone, N,N-dimethylpropionic acid amide, N,N-dimethylisobutyramide, N-methylformamide, and N,N'-dimethylpropyleneurea; and mixed solvents of them.

Among them, preferred are N,N-dimethylformamide, dimethyl sulfoxide, N-methyl-2-pyrrolidone, N,N-dimethylacetamide, and mixed system thereof, and particularly preferred are N,N-dimethylacetamide and N-methyl-2-pyrrolidone.

In the reaction in the first stage of scheme 1, any of various bases which are usually used during or after polymerization may be added.

The base is specifically exemplified by potassium carbonate, potassium hydroxide, sodium carbonate, sodium hydroxide, sodium bicarbonate, sodium ethoxide, sodium

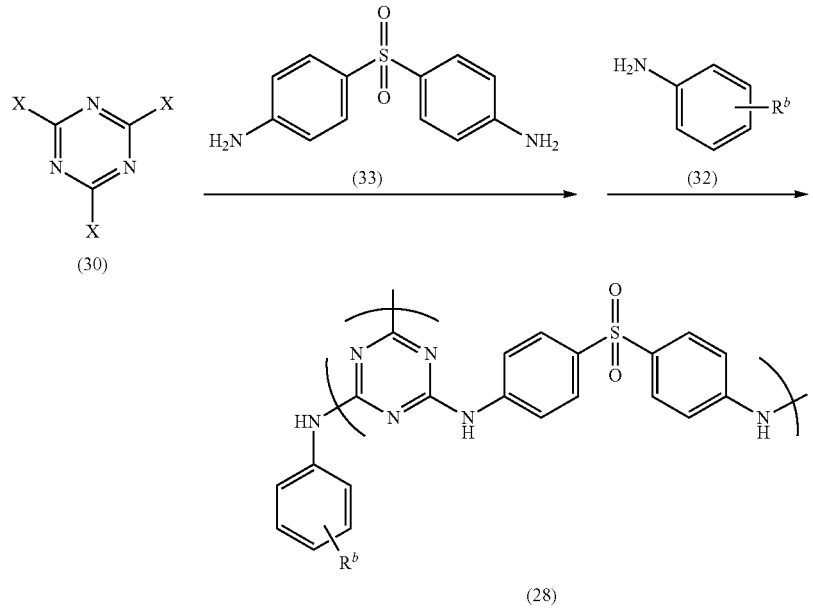

wherein X and $R^b$ are synonymous as above.

In the aforementioned reaction, loading ratio of the aryldiamino compound (33) is freely selectable so long as an intended polymer is obtainable, wherein the aryldiamino compound (33) preferably accounts for 0.01 to 10 equivaacetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, n-propylamine, trimethylamine, triethylamine, diisopropylamine, diisopropylethylamine, N-methylpiperidine, 2,2,6,6-tetramethyl-N-methylpiperidine, pyridine, 4-dimethylaminopyridine, and N-methylmorpholine.

The amount of addition of the base is preferably 1 to 100 equivalents per one equivalent of the triazine compound (30), and is more preferably 1 to 10 equivalents. These bases may be used in the form of aqueous solution.

Although the obtainable polymer is preferably free of residual raw material, the raw material may partially remain without undermining the effect of the present invention.

After completion of the reaction, the product may be easily purified typically by reprecipitation.

Employable method of blocking the terminal with use of the fluorine atom-containing aniline compound and the arylamino compound having crosslinking group may be any of known methods.

The total amount of consumption of the terminal blocking agents in this case is preferably about 0.05 to 10 equivalents, per one equivalent of halogen atom derived from excessive triazine compound remained unconsumed for the polymerization reaction, which is more preferably 0.1 to 5 equivalents, and even more preferably 0.5 to 2 equivalents.

The reaction solvent and the reaction temperature are exemplified by the conditions having been described regarding the reaction in the aforementioned first stage of scheme 1. The terminal blocking agents may be loaded together with the aryldiamino compound (33).

Alternatively, the terminal may be blocked with three or more kinds of groups, additionally with use of an arylamino compound having no substituent. The aryl group in such arylamino compound having no substituent is exemplified by the groups same as those described above.

As for the ratio of the fluorine atom-containing aniline compound and the arylamino compound having crosslinking group, the ratio of the arylamino compound having crosslinking group is preferably 0.5 to 1.5 mol per 1 mol of the fluorine atom-containing aniline compound, from the viewpoint of demonstrating solubility in the organic solvent and solvent resistance (crack resistance) in a well-balanced manner, wherein the ratio is more preferably 0.8 to 1.2 mol, even more preferably 0.9 to 1.1 mol, and yet more preferably 0.95 to 1.05 mol.

The aforementioned triazine ring-containing polymer of the present invention is suitably applicable as a film-forming composition. In this case, a crosslinking agent may be added.

The crosslinking agent is not specifically limited so long as it is a compound having a substituent capable of reacting with the crosslinking group of the aforementioned triazine ring-containing polymer.

This sort of compound is exemplified by melamine-based compound having crosslinkage-forming substituent such as methylol group or methoxymethyl group (for example, phenoplast compound, aminoplast compound, etc.); substituted urea-based compound; compound having crosslinkage-forming substituent such as epoxy group or oxetane group (for example, polyfunctional epoxy compound, polyfunctional oxetane compound, etc.); compound having blocked isocyanate group; compound having acid anhydride group; and compound having (meth)acrylic group. From the viewpoint of heat resistance and shelf stability, preferred are compound having epoxy group, blocked isocyanate group, or (meth)acrylic group; and particularly preferred are compound having blocked isocyanate group, and polyfunctional epoxy compound and/or polyfunctional (meth)acrylic compound capable of yielding photocurable composition without using initiator.

Note that these compounds, when intended for termination of the polymer, may only have at least one crosslinkage-forming substituent, meanwhile these compounds, when intended for crosslinking the polymers, necessarily have at least two crosslinkage-forming substituents.

The polyfunctional epoxy compound is not specifically limited so long as it has two or more epoxy groups per molecule.

Specific examples thereof include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl] propane, 1,2-cyclohexanedicarboxylic acid diglycidyl ester, 4,4'-methylenebis(N,N-diglycidylaniline), 3,4-epoxycyclohexylmethyl-3,4-epoxycyclohexanecarboxylate, trimethylolethane triglycidyl ether, bisphenol-A-diglycidyl ether, and pentaerythritol polyglycidyl ether.

Commercially available products employable here include epoxy resin having at least two epoxy groups such as YH-434 and YH-434L (from NIPPON STEEL Chemical & Materials Co., Ltd.); epoxy resin having a cyclohexene oxide structure such as EPOLEAD GT-401, GT-403, GT-301 and GT-302, CELLOXIDE 2021 and 3000 (from Daicel Corporation); bisphenol A type epoxy resin such as jER 1001, 1002, 1003, 1004, 1007, 1009, 1010 and 828 (all from Mitsubishi Chemical Corporation); bisphenol F type epoxy resin such as jER807 (from Mitsubishi Chemical Corporation); phenol novolac type epoxy resin such as jER 152 and 154 (both from Mitsubishi Chemical Corporation), EPPN201 and 202 (both from Nippon Kayaku Co., Ltd.); cresol novolac type epoxy resin such as EOCN-102, 1035, 1045, 1020, 1025 and 1027 (all from Nippon Kayaku Co., Ltd.), jER180S75 (from Mitsubishi Chemical Corporation); alicyclic epoxy resin such as Denacol EX-252 (from Nagase ChemteX Corporation), CY-175, CY177, and CY179 (all from CIBA-GEIGY A.G.), Araldite CY-182, CY-192, and CY-184 (all from CIBA-GEIGY A.G.), EPICLON 200 and 400 (both from DIC Corporation), jER 871 and 872 (both from Mitsubishi Chemical Corporation), ED-5661 and ED-5662 (both from Ceranise Coating Co., Ltd.); and aliphatic polyglycidyl ether such as Denacol EX-611, EX-612, EX-614, EX-622, EX-411, EX-512, EX-522, EX-421, EX-313, EX-314 and EX-321 (all from Nagase ChemteX Corporation).

The polyfunctional (meth)acryl compound is not specifically limited so long as it has two or more (meth)acryl groups per molecule.

Specific examples thereof include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerin triacrylate, ethoxylated glycerin trimethacrylate, ethoxylated pentaerythritol tetraacrylate, ethoxylated pentaerythritol tetramethacrylate, ethoxylated dipentaerythritol hexaacrylate, polyglycerin monoethylene oxide polyacrylate, polyglycerin polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate, 1,6-hexanediol dimethacrylate, and polybasic acid-modified acrylic oligomer.

The polyfunctional (meth)acrylic compound is commercially available, and specific examples thereof include NK Ester A-200, A-400, A-600, A-1000, and A-9300 (tris(2-acryloyloxyethyl) isocyanurate), A-9300-1CL, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, AT-20E, ATM-4E and ATM-35E (all from Shin-Nakamura Chemical Co., Ltd.), KAYARAD (registered trademark) DPEA-12, PEG400DA, THE-330, and RP-1040 (all from Nippon Kayaku Co., Ltd.), ARONIX M-210 and M-350 (both from Toagosei Co., Ltd.), KAYARAD (registered trademark) DPHA, NPGDA, and PET30 (all from Nippon Kayaku Co., Ltd.), NK Ester A-DPH, A-TMPT, A-DCP, A-HD-N, TMPT, DCP, NPG and HD-N (all from Shin-Nakamura Chemical Co., Ltd.), NK Oligo U-15HA (from Shin-Nakamura Chemical Co., Ltd.), NK Polymer Vanaresin GH-1203 (from Shin-Nakamura Chemical Co., Ltd.), and DN-0075 (from Nippon Kayaku Co., Ltd.).

Also the polybasic acid-modified acrylic oligomer is commercially available, and specific examples thereof include ARONIX M-510 and 520 (both from Toagosei Co., Ltd.).

The compound having acid anhydride group is not specifically limited so long as it is a carboxylic acid anhydride obtained by dehydration condensation of two carboxylic acid molecules, and specific examples thereof include compound having one acid anhydride group in the molecule, such as phthalic anhydride, tetrahydrophthalic anhydride, hexahydrophthalic anhydride, methyltetrahydrophthalic anhydride, methylhexahydrophthalic anhydride, nadic anhydride, methylnadic anhydride, maleic anhydride, succinic anhydride, octylsuccinic anhydride, and dodecenylsuccinic anhydride; and compound having two acid anhydride groups in the molecule, such as 1,2,3,4-cyclobutanetetracarboxylic dianhydride, pyromellitic anhydride, 3,4-dicarboxy-1,2,3,4-tetrahydro-1-naphthalenesuccinic dianhydride, bicyclo [3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis (3,4-dicarboxyphenyl) hexafluoropropane dianhydride, and 1,3-dimethyl-1,2,3,4-cyclobutanetetracarboxylic dianhydride.

The compound having blocked isocyanate group is not particularly limited so long as it has, per molecule, two or more blocked isocyanate groups having an appropriate protecting group for blocking the isocyanate group (—NCO), and so long as it releases the protecting group (block moiety) as a result of thermal dissociation when exposed to high temperatures during heat curing, allowing the generated isocyanate group to cause crosslinking reaction with the crosslinking group (hydroxy-containing group, for example) of the triazine ring-containing polymer of the present invention. The compound is exemplified by those having, per molecule, two or more groups represented by the formula below (these groups may be the same or different) in one molecule.

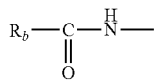

wherein $R^b$ represents an organic group in the blocking moiety.

This sort of compound is obtainable typically by reacting a compound having, per molecule, two or more isocyanate groups with an appropriate blocking agent.

The compound having, per molecule, two or more isocyanate groups is exemplified by polyisocyanate such as isophorone diisocyanate, 1,6-hexamethylene diisocyanate, methylenebis(4-cyclohexyl isocyanate), and trimethylhexamethylene diisocyanate; dimers and trimers thereof; and reaction products thereof with diols, triols, diamines, or triamines.

The blocking agent is exemplified by alcohols such as methanol, ethanol, isopropanol, n-butanol, 2-ethoxyhexanol, 2-N,N-dimethylaminoethanol, 2-ethoxyethanol, and cyclohexanol; phenols such as phenol, o-nitrophenol, p-chlorophenol, and o-, m- or p-cresol; lactams such as ε-caprolactam; oximes such as acetone oxime, methyl ethyl ketone oxime, methyl isobutyl ketone oxime, cyclohexanone oxime, acetophenone oxime, and benzophenone oxime; pyrazoles such as pyrazole, 3,5-dimethylpyrazole, and 3-methylpyrazole; and thiols such as dodecanethiol and benzenethiol.

The compound having blocked isocyanate group is also commercially available, and is specifically exemplified by TAKENATE (registered trademark) B-830, B-815N, B-842N, B-870N, B-874N, B-882N, B-7005, B-7030, B-7075, and B-5010 (all from Mitsui Chemicals, Inc.), Duranate (registered trademark) 17B-60PX, TPA-B80E, MF-B60X, MF-K60X, and E402-B80T (all from Asahi Kasei Corporation), Karenz MOI-BM (registered trademark) (from Showa Denko K.K.), and Trixene (registered trademark) BI-7950, BI-7951, BI-7960, BI-7961, BI-7963, BI-7982, BI-7991, and BI-7992 (from Baxenden Chemicals Ltd.).

The aminoplast compound is not specifically limited so long as it has, per molecule, two or more methoxymethyl groups, and is exemplified by melamine-based compound such as those named CYMEL Series that include hexamethoxymethylmelamine CYMEL (registered trademark) 303, tetrabutoxymethylglycoluril CYMEL 1170, tetramethoxymethylbenzoguanamine CYMEL 1123 (all from Nippon Cytec Industries, Ltd.); those named NIKALAC Series that include methylated melamine resin such as NIKALAC (registered trademark) MW-30HM, MW-390, MW-100LM, and MX-750LM, and methylated urea resin such as NIKALAC MX-270, MX-280, and MX-290 (all from SANWA Chemical Co., Ltd.).

The polyfunctional oxetane compound is not specifically limited so long as it has, per molecule, two or more oxetanyl groups, and is exemplified by OXT-221, OX-SQ-H, and OX-SC (all from Toagosei Co., Ltd.) that contain oxetanyl group.

The phenoplast compound has two or more hydroxymethyl groups per molecule, and causes, when exposed high temperatures during thermal curing, a crosslinking reaction based on dehydration condensation with the crosslinking group of the triazine ring-containing polymer of the present invention to proceed.

The phenoplast compound is exemplified by 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis (4-hydroxy-2,5-dimethylphenyl)formylmethane, and α,α-bis(4-hydroxy-2,5-dimethylphenyl)-4-formyltoluene.

The phenoplast compound is also commercially available, and is specifically exemplified by 26DMPC, 46DMOC, DM-BIPC-F, DM-BIOC-F, TM-BIP-A, BISA-F, BI25X-DF, and BI25X-TPA (all from Asahi Yukizai Corporation).

Among them, polyfunctional (meth)acrylic compound is preferred from the viewpoint of capability of suppressing decrease in the refractive index due to blending of the crosslinking agent, and of allowing rapid progress of the curing reaction, and in particular, polyfunctional (meth)acrylic compound, shown below, having an isocyanuric acid skeleton is more preferred for its excellence in compatibility with the triazine ring-containing polymer.

The polyfunctional (meth)acrylic compound having such skeleton is exemplified by NK Ester A-9300 and NK Ester A-9300-1CL (both from Shin-Nakamura Chemical Co., Ltd.).

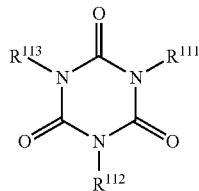

wherein each of $R^{111}$ to $R^{113}$ independently represents a monovalent organic group having at least one (meth)acrylic group at the terminal.

Also from the viewpoint of further improving the curing rate, and enhancing the solvent resistance, acid resistance, and alkali resistance of the obtainable cured film, it is preferred to use polyfunctional (meth)acrylic compound that exists in a liquid form at 25° C., and has a viscosity of 5,000 mPa·s or lower, preferably 1 to 3,000 mPa·s, more preferably 1 to 1,000 mPa·s, and even more preferably 1 to 500 mPa s (referred to as low viscosity crosslinking agent, hereinafter) independently, or by combining two or more kinds of them, or by combining it with the aforementioned polyfunctional (meth)acrylic compound having an isocyanuric acid skeleton.

Also this sort of low-viscosity crosslinking agent is commercially available, and from among the aforementioned polyfunctional (meth)acrylic compounds, typically exemplified are crosslinking agents having a relatively long chain between (meth)acrylic groups, such as NK ester A-GLY-3E (85 mPa·s, 25° C.), A-GLY-9E (95 mPa·s, 25° C.), A-GLY-20E (200 mPa·s, 25° C.), A-TMPT-3EO (60 mPa·s, 25° C.), A-TMPT-9EO, ATM-4E (150 mPa·s, 25° C.), and ATM-35E (350 mPa·s, 25° C.) (all from Shin-Nakamura Chemical Co., Ltd.).

In further consideration of also improving the alkali resistance of the obtainable cured film, preferred is use of at least either NK ester A-GLY-20E (from Shin Nakamura Chemical Co., Ltd.) or ATM-35E (from Shin Nakamura Chemical Co., Ltd.), in combination with the polyfunctional (meth)acrylic compound having an isocyanuric acid skeleton.

In an additional case where a film formed of the triazine ring-containing polymer of the present invention is stacked on a protective film typically formed of PET or polyolefin and intended for photo-irradiation through the protective film, good curability of the film stacked film is obtainable without being affected by oxygen inhibition. Since the protective film needs to be peeled off after the curing, so that preferred is use of polybasic acid-modified acrylic oligomer that gives an easy-peel film.

The aforementioned crosslinking agents may be used independently, or by combining two or more kinds of them. The amount of consumption of the crosslinking agent is preferably 1 to 100 parts, per 100 parts by mass of the triazine ring-containing polymer, wherein considering the solvent resistance, the lower limit thereof is preferably 2 parts by mass, and more preferably 5 parts by mass, meanwhile again considering controllability of the refractive index, the upper limit thereof is preferably 20 parts by mass, and more preferably 15 parts by mass.

The composition of the present invention may also be blended with an initiator suited to each crosslinking agent. Note in a case where the polyfunctional epoxy compound and/or the polyfunctional (meth)acrylic compound is used as the crosslinking agent, an initiator may be used, although the photo-curing can proceed to give a cured film even without the initiator, as described previously.

In a case where the polyfunctional epoxy compound is used as the crosslinking agent, a photoacid generator or a photobase generator may be used.

The photoacid generator may only be properly selectable from known ones for use, for which onium salt derivatives such as diazonium salt, sulfonium salt and iodonium salt may be typically used.

Specific examples thereof include aryl diazonium salt such as phenyl diazonium hexafluorophosphate, 4-methoxyphenyldiazonium hexafluoroantimonate, and 4-methylphenyldiazonium hexafluorophosphate; diaryliodonium salt such as diphenyliodonium hexafluoroantimonate, di(4-methylphenyl)iodonium hexafluorophosphate, and di(4-tert-butylphenyl)iodonium hexafluorophosphate; and triarylsulfonium salt such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bishexafluoroantimonate, 4,4'-bis(diphenylsulfonio)phenylsulfide bishexafluorophosphate, 4,4'-bis[di(β-hydroxyethoxy)phenylsulfonio]phenyl sulfide bishexafluoroantimonate, 4,4'-bis[di(β-hydroxyethoxy)phenylsulfonio]phenyl sulfide bishexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

These onium salts may be commercially available, and is specifically exemplified by Sun-Aid SI-60, SI-80, SI-100, SI-60L, SI-80L, SI-100L, SI-L145, SI-L150, SI-L160, SI-L110 and SI-L147 (all from Sanshin Chemical Industry Co., Ltd.); UVI-6950, UVI-6970, UVI-6974, UVI-6990, UVI-6992 (all from Union Carbide Corporation); CPI-100P, CPI-100A, CPI-200K and CPI-200S (all from San-Apro Ltd.); Adeka Optomer SP-150, SP-151, SP-170 and SP-171 (all from ADEKA Corporation); Irgacure 261 (from BASF SE); CI-2481, CI-2624, CI-2639 and CI-2064 (all from Nippon Soda Co., Ltd.); CD-1010, CD-1011 and CD-1012 (all from Sartomer); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103 and BBI-109, (all from Midori Kagaku Co., Ltd.); PCI-061T, PCI-062T, PCI-020T and PCI-022T (all from Nippon Kayaku Co., Ltd.); and IBPF and IBCF (from SANWA Chemical Co., Ltd.).

On the other hand, also the photobase generator may only be properly selectable from known ones for use, for which Co-amine complex-based, oxime carboxylate ester-based, carbamate ester-based, and quaternary ammonium salt-based photobase generators may be used.

Specific examples thereof include 2-nitrobenzylcyclohexyl carbamate, triphenylmethanol, O-carbamoylhydroxylamide, O-carbamoyloxime, [[(2,6-dinitrobenzyl)oxy]carbonyl]cyclohexylamine, bis[[(2-nitrobenzyl)oxy]carbonyl] hexane-1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl) pyrrolidine, hexaamminecobalt (III) tris (triphenylmethylborate), 2-benzyl-2-dimethylamino-1-(4-morpholinophenyl)butanone, 2,6-dimethyl-3,5-diacetyl-4-(2'-nitrophenyl)-1,4-dihydropyridine, and 2,6-dimethyl-3,5-diacetyl-4-(2',4'-dinitrophenyl)-1,4-dihydropyridine.

Alternatively, the photobase generator may be commercially available, and is specifically exemplified by TPS-OH, NBC-101 and ANC-101 (all from Midori Kagaku Co., Ltd.).

The amount of consumption of the photoacid or photobase generator, when used, is preferably in the range from 0.1 to 15 parts by mass, per 100 parts by mass of the polyfunctional epoxy compound, and more preferably in the range from 1 to 10 parts by mass.

Optionally, 1 to 100 parts by mass of an epoxy resin curing agent may be blended per 100 parts by mass of the polyfunctional epoxy compound.

Meanwhile, in a case where the polyfunctional (meth)acrylic compound is used, a photoradical polymerization initiator may be used.

Also the photoradical polymerization initiator may only be properly selectable from known ones for use, and is exemplified by acetophenones, benzophenones, Michler's benzoyl benzoates, amyloxime esters, oxime esters, tetramethylthiuram monosulfide, and thioxanthones.

In particular, preferred is a photo-cleavable photoradical polymerization initiator. The photocleavable photoradical polymerization initiator has been described in "Saishin UV Koka Gijutu (in Japanese, Latest UV Curing Technology) (p. 159, issued by: Kazuhiro Takausu, published by: Technical Information Institute Co., Ltd., 1991). Commercially available photoradical polymerization initiator is exemplified by Irgacure (trade name) 127, 184, 369, 379, 379EG, 651, 500, 754, 819, 903, 907, 784, 2959, CGI1700, CGI1750, CGI1850, CG24-61, OXE01, OXE02, Darocur 1116, 1173 and MBF from BASF; Lucirin (trade name) TPO from BASF; Ebecryl P36 from UCB Inc.; Esacure (trade name) KIP150, KIP65LT, KIP100F, KT37, KT55, KT046 and KIP75/B from Fratelli Lamberti S.p.A.

The amount of consumption of the photoradical polymerization initiator, when used, is preferably in the range from 0.1 to 200 parts by mass, per 100 parts by mass of the polyfunctional (meth)acrylate compound, and more preferably in the range from 1 to 150 parts by mass.

To the composition of the present invention, a polyfunctional thiol compound having two or more mercapto groups per molecule may further be added, typically for the purpose of promoting the reaction between the triazine ring-containing polymer and the crosslinking agent.

More specifically, preferred is a polyfunctional thiol compound represented by the formula below.

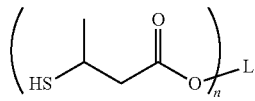

L represents a divalent to tetravalent organic group, and is preferably a divalent to tetravalent aliphatic group having 2 to 12 carbon atoms, or a divalent to tetravalent heterocyclic ring-containing group; and is more preferably a divalent to tetravalent aliphatic group having 2 to 8 carbon atoms, or a trivalent group having an isocyanuric acid skeleton (1,3,5-triazine-2,4,6-(1H,3H,5H)-trione ring) represented by the formula below.

n represents an integer of 2 to 4 corresponding to the valence of L.

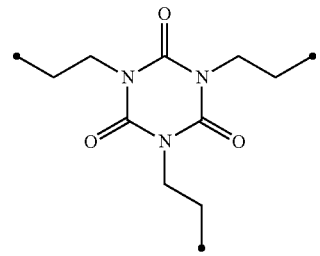

wherein "·" represents a site of bonding with an oxygen atom.

The compound is specifically exemplified by 1,4-bis(3-mercaptobutyryloxy)butane, 1,3,5-tris(3-mercaptobutyryloxyethyl)-1,3,5-triazine-2,4,6-(1H,3H,5H)-trione, pentaerythritol tetrakis(3-mercaptobutyrate), trimethylolpropane tris(3-mercaptobutyrate), and trimethylolethane tris (3-mercaptobutyrate).

These polyfunctional thiol compounds are also commercially available, and are exemplified by Karenz MT BD1, Karenz MT NR1, Karenz MT PE1, TPMB and TEMB (all from Showa Denko K.K.).

These polyfunctional thiol compounds may be used independently, or by combining two or more kinds of them.

Although the amount of addition of the polyfunctional thiol compound, when used, is not particularly limited so long as it would not adversely affect the obtainable film, the amount in the present invention is preferably 0.01 to 10% by mass, per 100% by mass of the solid content, and more preferably 0.03 to 6% by mass.

The composition of the present invention is preferably used after adding various solvent to dissolve therein the triazine ring-containing polymer.

The solvent is exemplified by water, toluene, p-xylene, o-xylene, m-xylene, ethylbenzene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofuryl alcohol, propylene glycol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl normal butyl ketone, cyclopentanone, cyclohexanone, ethyl acetate, isopropyl acetate, normal propyl acetate, isobutyl acetate, normal butyl acetate, ethyl lactate, methanol, ethanol, isopropanol, tert-butanol, allyl alcohol, normal propanol, 2-methyl-2-butanol, isobutanol, normal butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide (DMAc), N-methylpyrrolidone, 1,3 dimethyl-2-imidazolidinone, dimethylsulfoxide, and N-cyclohexyl-2-pyrrolidinone. All of them may be used independently, or by combining two or more kinds of them.

The triazine ring-containing polymer of the present invention excels in solubility in the organic solvent as described previously, and is highly soluble in glycol ester-based solvent such as ethylene glycol monomethyl ether acetate, propylene glycol monomethyl ether acetate, diethylene glycol monobutyl ether acetate, and diethylene glycol monoethyl ether acetate; ketone-based solvent such as acetone, methyl ethyl ketone, methyl isobutyl ketone, diisobutyl ketone, cyclopentanone, cyclohexanone, and diacetone alcohol; and ester-based solvents such as ethyl acetate, methyl acetate, butyl acetate, methoxybutyl acetate, cellosolve acetate, amyl acetate, normal propyl acetate, isopropyl acetate, methyl lactate, ethyl lactate, and butyl lactate. The triazine ring-containing polymer is therefore particularly preferred for forming the film at a site where any of these solvents is required.

The solid concentration in the composition in this case is not specifically limited so long as it would not affect the shelf stability, and may only be determined suitably depending on desired thickness of the film. More specifically, the solid content is preferably 0.1 to 50% by mass from the viewpoint of solubility and shelf stability, and is more preferably 0.1 to 40% by mass.

The composition of the present invention may contain any ingredient other than the triazine ring-containing polymer, the crosslinking agent and the solvent, which may typically be additives such as leveling agent, surfactant, and silane coupling agent, so long as the effect of the present invention will not be undermined.

The surfactant is exemplified by polyoxyethylene alkyl ether such as polyoxyethylene lauryl ether, polyoxyethylene stearyl ether, polyoxyethylene cetyl ether, and polyoxyethylene oleyl ether; polyoxyethylene alkyl allyl ethers such as polyoxyethylene octylphenol ether and polyoxyethylene nonylphenol ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; nonionic surfactants such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; fluorine-containing surfactants under trade names of EFTOP EF301, EF303 and EF352 (from Mitsubishi Materials Electronic Chemicals Co., Ltd., formerly Gemco Inc.)), Megaface F171, F173, R-08, R-30, R-40, F-553, F-554, RS-75 and RS-72K (from DIC Corporation), Fluorad FC430 and FC431 (from Sumitomo 3M Limited), AsahiGuard AG 710, Surflon S-382, SC101, SC102, SC103, SC104, SC105 and SC106 (from AGC Inc.); and organosiloxane polymers KP341 (from Shin-Etsu Chemical Co., Ltd), BYK-302, BYK-307, BYK-322, BYK-323, BYK-330, BYK-333, BYK-370, BYK-375 and BYK-378 (from BYK Japan KK).

These surfactants may be used independently, or by combining two or more kinds of them. The amount of consumption of the surfactant is preferably 0.0001 to 5 parts by mass, per 100 parts by mass of the triazine ring-containing polymer, more preferably 0.001 to 1 part by mass, and even more preferably 0.01 to 0.5 parts by mass.

The film-forming composition of the present invention may be applied to a base, optionally followed by heating to evaporate the solvent off, and then may be heated or irradiated with light to form a desired cured film.

Method for applying the composition is freely selectable, for which employable is any of methods including spin coating, dipping, flow coating, ink-jetting, jet dispensing, spraying, bar coating, gravure coating, slit coating, roll coating, transfer printing, brush coating, blade coating, and air knife coating.

The base is exemplified by those formed of silicon, glass with indium tin oxide (ITO) film formed thereon, glass with indium zinc oxide (IZO) film formed thereon, metal nanowire, polyethylene terephthalate (PET), plastic, glass, quartz, and ceramic. Also flexible base having flexibility is employable.

Temperature of baking for evaporating off the solvent is typically, but not specifically limited to, 110 to 400° C.

Method for the baking is typically, but not specifically limited to, evaporation with use of a hot plate or an oven, under an appropriate atmosphere such as the ambient air, inert gas such as nitrogen, or vacuum.

The temperature and time of the baking may only be suitably selected according to processes for obtaining desired electronic device, that is, the baking condition is selectable so that the physical values of the resulting film conform to the required characteristics of the electronic device.

Also conditions for photo-irradiation are not specifically limited, for which any appropriate energy and time of irradiation are used, depending on the triazine ring-containing polymer and the crosslinking agent to be employed.

The film and cured film obtained as described above can achieve high heat resistance, high refractive index and low volume shrinkage, and are therefore suitably applicable to the fields of electronic devices and optical materials, when manufacturing a part of liquid crystal display, organic EL element (organic EL display or organic EL lighting), touch panel, optical semiconductor (LED) element, solid-state image sensor, organic thin-film solar cell, dye-sensitized solar cell, organic thin-film transistor (TFT), lens, prism, camera, binoculars, microscope, semiconductor exposure apparatus, and the like.

In particular, the film and cured film formed of the composition of the present invention demonstrates high transparency and high refractive index, and can therefore improve when applied to a planarization layer or a light scattering layer of organic EL lighting, the light extraction efficiency (light diffusion efficiency) and the durability thereof.

When using the composition of the present invention for the light scattering layer of organic EL lighting, any of known light diffusing agents may be used without special limitation. They may be used independently, two or more kinds of them in the same category may be combined for use, or two or more kinds of them in different categories may be combined for use.

Examples of the light diffusing agent include organic light diffusing agent or the like.

The organic light diffusing agent is exemplified by crosslinked poly(methyl methacrylate) (PMMA) particle, crosslinked poly(methyl acrylate) particle, crosslinked polystyrene particle, crosslinked styrene acrylic copolymer particle, melamine-formaldehyde particle, silicone resin particle, silica-acrylic composite particle, nylon particle, benzoguanamine-formaldehyde particle, benzoguanamine-melamine-formaldehyde particle, fluororesin particle, epoxy resin particle, polyphenylene sulfide resin particle, polyethersulfone resin particle, polyacrylonitrile particle, and polyurethane particle.

These light diffusing agents may be surface-treated with an appropriate surface modifier.

EXAMPLES

The present invention will be described more specifically referring to Examples and Comparative Examples, where the present invention is not limited to the Examples below. The measurement apparatuses used in Examples are as follows.

[$^1$H-NMR]
  Apparatus: Bruker NMR System AVANCE III HD 500 (500 MHz)
  Measuring solvent: DMSO-d6
  Reference material: tetramethylsilane (TMS) (δ 0.0 ppm)
[GPC]
  Apparatus: HLC-8200 GPC, from Tosoh Corporation
  Column: Tosoh TSKgel α-3000+Tosoh TSKgel α-4000
  Column temperature: 40° C.
  Solvent: dimethylformamide (DMF)
  Detector: UV (271 nm)
  Calibration curve: standard polystyrene
[Ellipsometer]
  Apparatus: multi-incident angle spectroscopic ellipsometer VASE, from J. A. Woollam Japan Corporation
[Spectrophotometric Colorimeter]
  Apparatus: CM-3700 A, from Konica Minolta, Inc.
[Optical Microscope]
  Apparatus: OLYMPUS BX 51, from Olympus Corporation

[1] Synthesis of Triazine Ring-Containing Polymer

[Example 1-1] Synthesis of Polymer Compound [5]

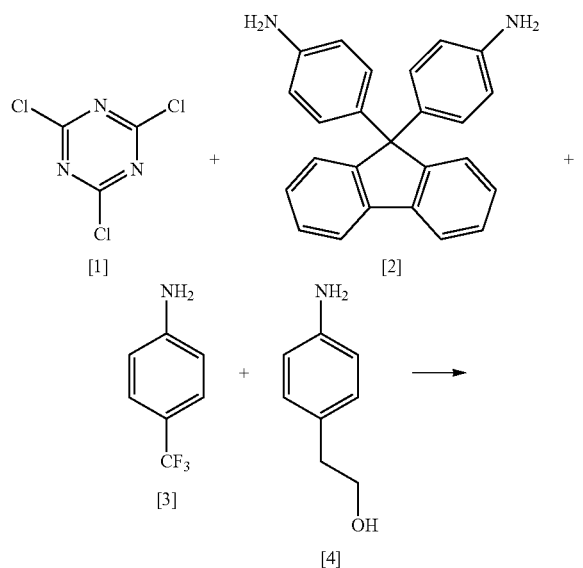

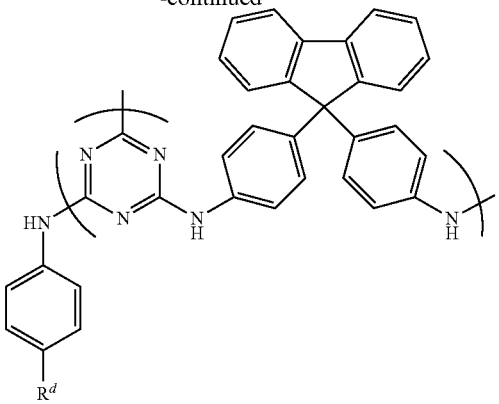

$R^d$: $CF_3$ or $CH_2CH_2OH$

[5]

Into a 3000 mL four-necked flask, placed were 9,9-bis(4-aminophenyl)fluorene [2] (264.53 g, 0.759 mol, from JFE Chemical Corporation) and 2,022.64 g of dimethylacetamide (DMAc, from Kanto Chemical Co., Inc.), the inside of the flask was replaced with nitrogen, and the content was stirred to dissolve 9,9-bis(4-aminophenyl)fluorene [2] in DMAc. The content was then cooled on an ethanol-dry ice bath down to −10° C., to which 2,4,6-trichloro-1,3,5-triazine [1] (140.00 g, 0.759 mol, from Tokyo Chemical Industry Co., Ltd.) was added while monitoring so that the internal temperature would not reach or exceed 0° C. After 30-minute stirring the reaction liquid, 2,022.64 g of DMAc was added to a 5,000 mL four-necked flask in advance, and after nitrogen replacement and after setting the oil bath was set at 90 to 100° C., the reaction liquid was added dropwise into a 5,000 mL four-necked flask, while keeping the internal temperature at 70° C.±5° C. After one-hour stirring at an internal temperature of 70° C., 4-trifluoromethylaniline [3] (122.32 g, 0.759 mol, from Tianjin Jiahan Chemical Co., Ltd.) and 2-(4-aminophenyl) ethanol [4] (104.14 g, 0.759 mol, from Sugai Chemical Ind. Co., Ltd.), preliminarily dissolved in 208.29 g of DMAc, were added dropwise, and the content was stirred for 3 hours. The content was then cooled down to room temperature, to which n-propylamine (134.63 g, from Tokyo Chemical Industry Co., Ltd.) was added dropwise, the content was stirred for 30 minutes, and the stirring was stopped. The reaction liquid was added dropwise to ion-exchanged water (7,027 g) to which 501.9 g of ammonium acetate has been added, to cause reprecipitation. The precipitate was collected by filtration, re-dissolved into THF (3,585 g), to which ammonium acetate (209 g) and ion-exchanged water (149 g) were added, and the solution was stirred for 30 minutes. After stopping the stirring, the liquid was transferred to a separating funnel, separated into an organic layer and an aqueous layer, and the organic layer was collected. The collected organic layer was added dropwise to a mixed solution of methanol (2,008 g) and ion-exchanged water (5,019 g), to cause reprecipitation again. The resulted precipitate was collected by filtration, and dried in a vacuum dryer at 120° C. for 8 hours, to obtain 424.3 g of a desired polymer compound [5] (referred to as P-1, hereinafter). The measurement result of $^1$H-NMR spectrum of the compound P-1 is illustrated in FIG. 1.

The weight average molecular weight Mw of the compound P-1 in terms of polystyrene, measured by GPC, was found to be 7,700, and the polydispersity Mw/Mn was found to be 2.7.

[Example 1-2] Synthesis of Polymer Compound [6]

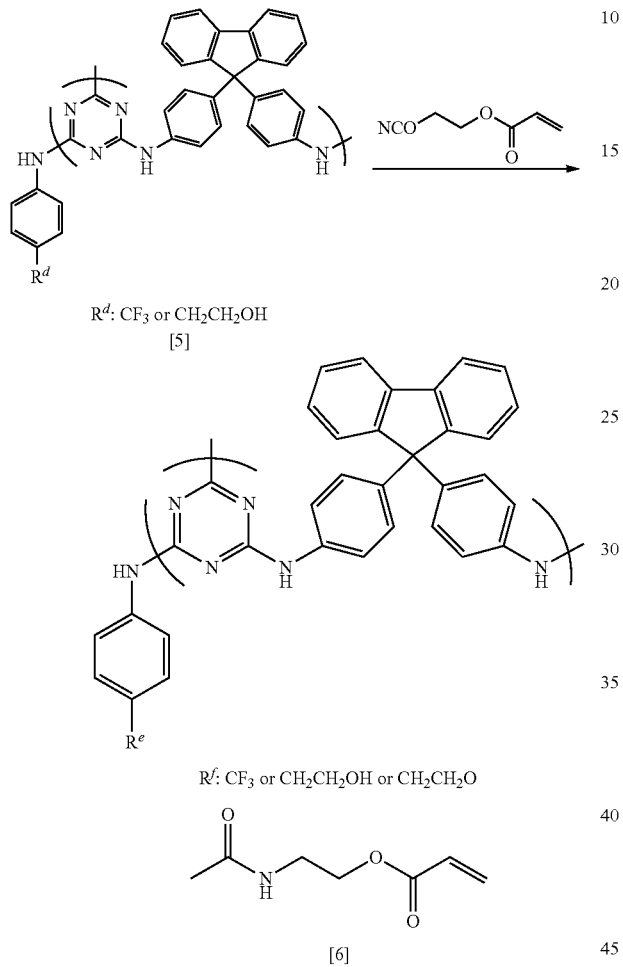

The weight average molecular weight Mw of the compound P-2 in terms of polystyrene, measured by GPC, was found to be 6,140, and the polydispersity Mw/Mn was found to be 2.4.

[Example 1-3] Synthesis of Polymer Compound [9]

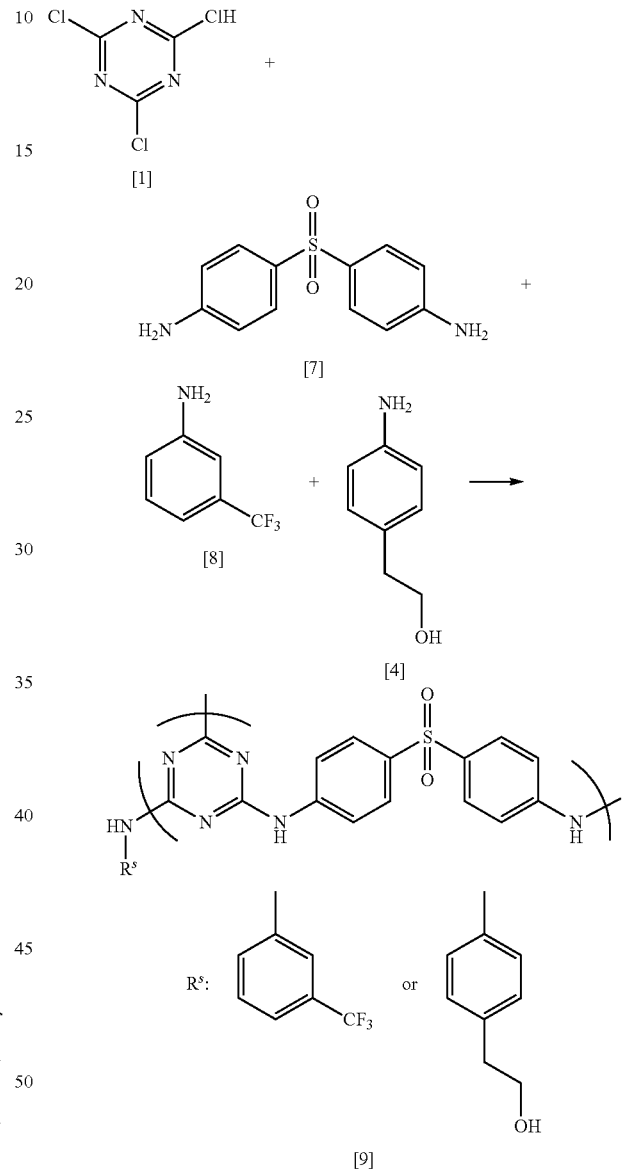

Figure 2:
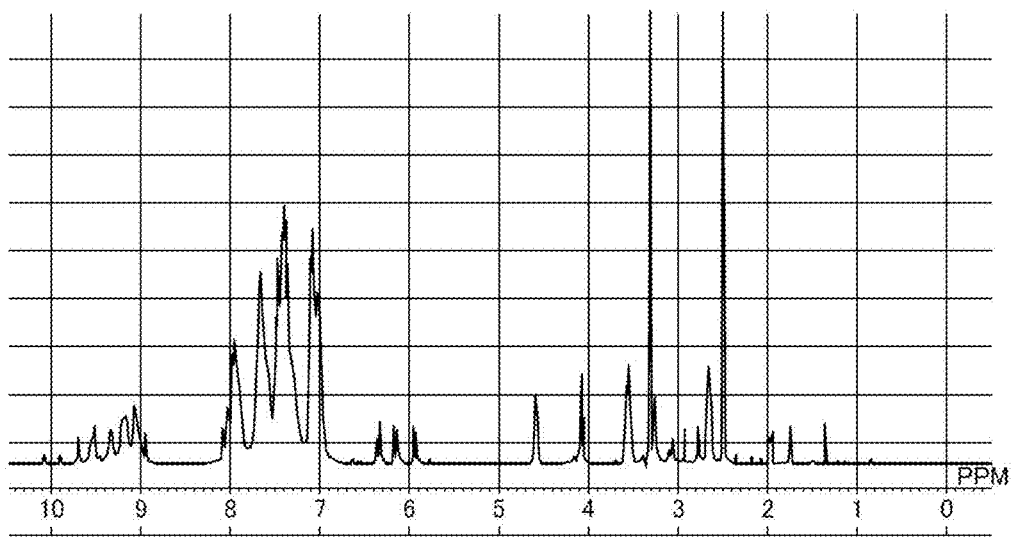
FIG. 2 is a $^1$H-NMR spectral chart of polymer compound [6] obtained in Example 1-2.

Into a 150 mL four-necked flask, placed were 20.0 g of P-1 synthesized in Example 1-1, 100.0 g of tetrahydrofuran (THF, from Junsei Chemical Co., Ltd.), and 2.58 g of pure water, the inside of the flask was replaced with nitrogen, and the content was stirred to dissolve P-1 in THF. The content was then heated so as to elevate the inner temperature to 60° C., to which 3.38 g of 2-isocyanatoethyl acrylate (Karenz AOI, from Showa Denko K.K.) was added, and the content was stirred for 3 hours. Then, after cooling down to room temperature, the reaction liquid was added dropwise into a mixed solution of methanol (189 g) and ion-exchanged water (113 g), to cause reprecipitation. The resulted precipitate was collected by filtration, and dried in a vacuum dryer at 80° C. for 3 hours, to obtain 17.9 g of a desired polymer compound [6](referred to as P-2, hereinafter). The measurement result of $^1$H-NMR spectrum of the compound P-2 is illustrated in FIG. 2.

Figure 3:
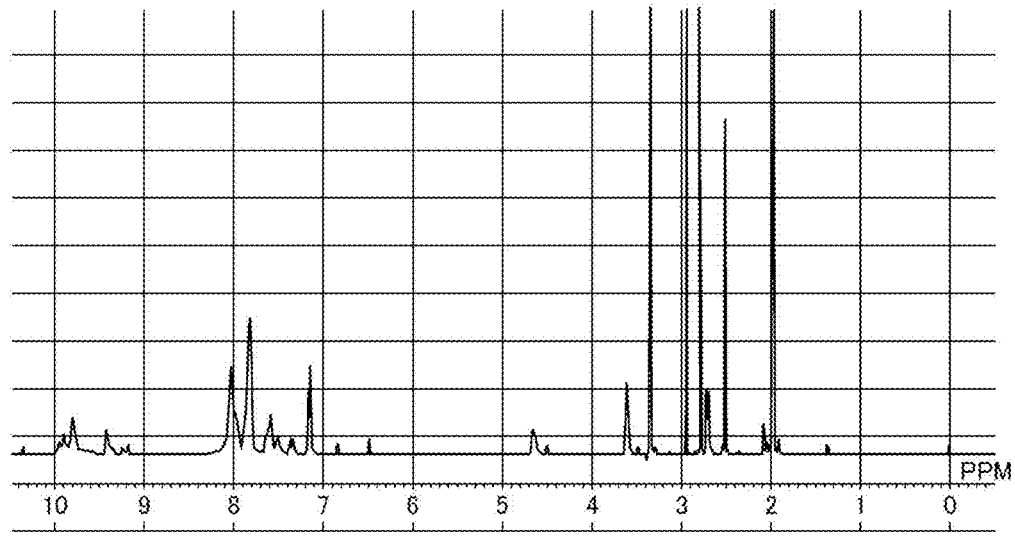
FIG. 3 is a $^1$H-NMR spectral chart of polymer compound [9] obtained in Example 1-3.

Into a 1,000 mL four-necked flask, placed were 4,4'-diphenylaminosulfone [7] (53.86 g, 0.217 mol, from Mitsui Fine Chemicals, Inc.) and 525.61 g of dimethylacetamide (DMAc, from Kanto Chemical Co., Inc.), the inside of the flask was replaced with nitrogen, and the content was stirred to dissolve 4,4'-diphenylaminosulfone [7] in DMAc. The content was then cooled on an ethanol-dry ice bath down to −10° C., to which 2,4,6-trichloro-1,3,5-triazine [1](40.00 g, 0.217 mol, from Tokyo Chemical Industry Co., Ltd.) was added while monitoring so that the internal temperature would not reach or exceed 0° C. After 30-minute stirring, the reaction liquid in a reaction vessel was transferred onto an oil bath preset at 90 to 100° C., and heated up to an inner temperature to 85° C.±5° C. After one-hour stirring, 2-(4-aminophenyl)ethanol [4] (44.63 g, 0.325 mol, from Oakwood Products, Inc.) and 3-trifluoromethylaniline [8] (17.47 g, 0.108 mol, from Tokyo Chemical Industry Co., Ltd.), both preliminarily dissolved in 98.55 g of dimethylacetamide, were added dropwise, and the content was stirred for 3 hours. 2-Aminoethanol (39.75 g, from Tokyo Chemical Industry Co., Ltd.) was then added dropwise, the content was cooled down to room temperature, stirred for 30 minutes, and the stirring was stopped. THF (426 g), ammonium acetate (298 g) and ion-exchanged water (298 g) were added to the reaction liquid, and the content was stirred for 30 minutes. After stopping the stirring, the liquid was transferred to a separating funnel, separated into an organic layer and an aqueous layer, and the organic layer was collected. The collected organic layer was added dropwise into a mixed solution of methanol (426 g) and ion-exchanged water (853 g), to cause reprecipitation. The resulted precipitate was collected by filtration, and dried in a vacuum dryer at 120° C. for 8 hours, to obtain 103.6 g of a desired polymer compound [9](referred to as P-3, hereinafter). The measurement result of $^1$H-NMR spectrum of the compound P-3 is illustrated in FIG. 3.

The weight average molecular weight Mw of the compound P-3 in terms of polystyrene, measured by GPC, was found to be 11,070, and the polydispersity Mw/Mn was found to be 3.2.

[Comparative Example 1-1] Synthesis of Polymer Compound [11]

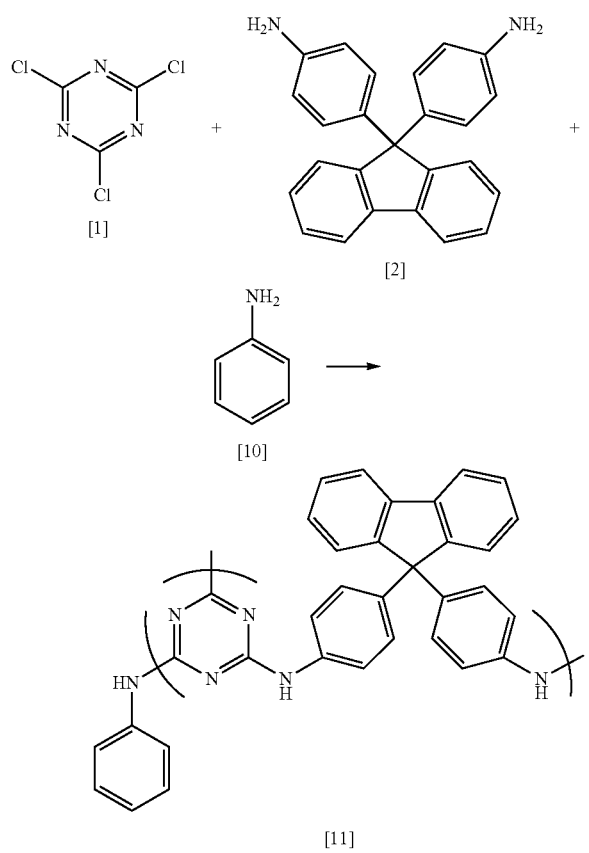

Figure 4:
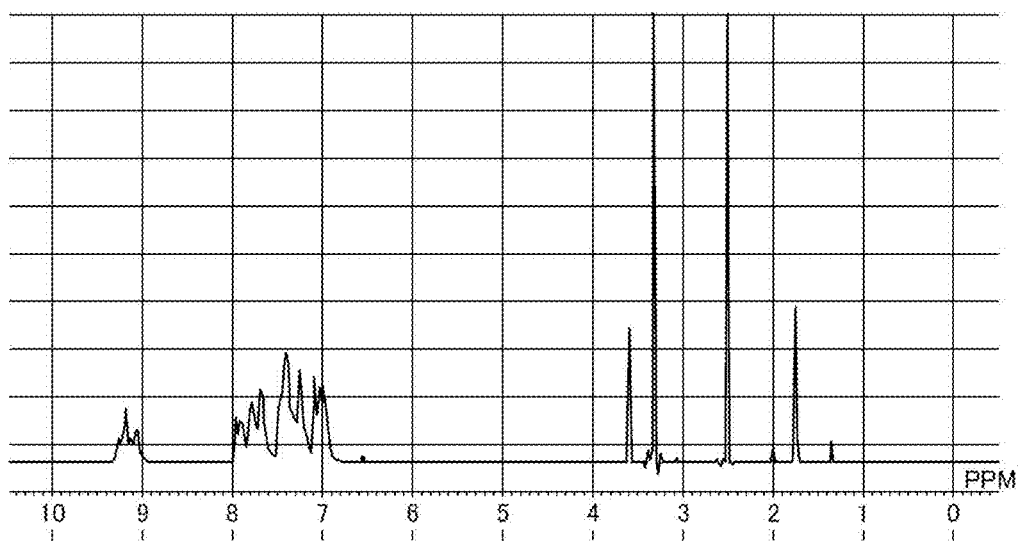
FIG. 4 is a $^1$H-NMR spectral chart of polymer compound [11] obtained in Comparative Example 1-1.

Into a 1,000 mL four-necked flask, placed were 9,9-bis(4-aminophenyl)fluorene [2] (45.35 g, 0.130 mol, from JFE Chemical Corporation) and 346.74 g of dimethylacetamide (DMAc, from Kanto Chemical Co., Inc.), the inside of the flask was replaced with nitrogen, and the content was stirred to dissolve 9,9-bis(4-aminophenyl)fluorene [2] in DMAc. The content was then cooled on an ethanol-dry ice bath down to −10° C., to which 2,4,6-trichloro-1,3,5-triazine [1] (24.00 g, 0.130 mol, from Tokyo Chemical Industry Co., Ltd.) was added while monitoring so that the internal temperature would not reach or exceed 0° C. After 30-minute stirring the reaction liquid, 346.74 g of DMAc was added to a 1,000 mL four-necked flask in advance, and after nitrogen replacement and after setting the oil bath at 90 to 100° C., the reaction liquid was added dropwise into the 1,000 mL four-necked flask, while keeping the internal temperature at 85° C.±5° C. After one-hour stirring at an internal temperature of 85° C., aniline [10] (36.36 g, 0.390 mol, from Tokyo Chemical Industry Co., Ltd.) was added dropwise, and the content was stirred for 3 hours. The content was then cooled down to room temperature, to which n-propylamine (23.08 g, from Tokyo Chemical Industry Co., Ltd.) was added dropwise, the content was stirred for 30 minutes, and the stirring was stopped. The reaction liquid was added dropwise to ion-exchanged water (2,056 g) to which 28.8 g of ammonium acetate has been added, to cause reprecipitation. The precipitate was collected by filtration, re-dissolved into THF (556 g), to which a 25% ammonia water (92.6 g), ammonium acetate (46.3 g) and ion-exchanged water (138.9 g) were added, and the solution was stirred for 30 minutes. After stopping the stirring, the liquid was transferred to a separating funnel, separated into an organic layer and an aqueous layer, and the organic layer was collected. The collected organic layer was added dropwise to a mixed solution of methanol (740 g) and ion-exchanged water (1,702 g), to cause reprecipitation again. The resulted precipitate was collected by filtration, and dried in a vacuum dryer at 120° C. for 8 hours, to obtain 47.4 g of a desired polymer compound [11] (referred to as P-4, hereinafter). The measurement result of $^1$H-NMR spectrum of the compound P-4 is illustrated in FIG. 4.

The weight average molecular weight Mw of the compound P-4 in terms of polystyrene, measured by GPC, was found to be 6,050, and the polydispersity Mw/Mn was found to be 2.6.

[2] Verification of Solubility

Example 2-1

P-1 (2.5 g) obtained in Example 1-1 was dissolved in each of propylene glycol monomethyl ether (abbreviated as PGME, hereinafter) (10.0 g), propylene glycol monomethyl ether acetate (abbreviated as PGMEA, hereinafter) (10.0 g), and cyclopentanone (abbreviated as CPN, hereinafter) (10.0 g), showing good solubility in all solvents to give homogeneous varnishes.

Comparative Example 2-1

P-4 (2.5 g) obtained in Comparative Example 1-1 was placed in each of PGME (10.0 g), PGMEA (10.0 g) and CPN (10.0 g), and was found to dissolve only in CPN, but not in PGME and PGMEA.

[3] Preparation of Film-Forming Composition, and Formation of Film

Example 3-1

P-1 (2.5 g) obtained in Example 1-1 was dissolved in CPN (2.5 g), to prepare a homogeneous and clear varnish (referred to as P-1 solution, hereinafter).

The obtained P-1 solution was spin-coated over a 50 mm×50 mm×0.7 mm thick alkali-free glass substrate with use of a spin coater at a target thickness of 500 nm, pre-baked at 100° C. for one minute on a hot plate, followed by main baking at 250° C. for 5 minutes, to obtain a film (referred to as P-1 film, hereinafter).

Comparative Example 3-1

A film (referred to as a P-2 film, hereinafter) was obtained in the same manner as in Example 3-1, except that P-4 was used in place of P-1.

The refractive index and thickness of the films formed in Example 3-1 and Comparative Example 3-1 are summarized in Table 1.

TABLE 1

|  | Example 3-1 | Comparative Example 3-1 |
|---|---|---|
| Refractive index (@550 nm) | 1.717 | 1.737 |
| Thickness (nm) | 535 | 595 |

As judged from Example 2-1, Comparative Example 2-1 and Table 1, the film formed of the polymer compound obtained in Example 1-1 was found to have a refractive index exceeding 1.71, while improving the solubility in the organic solvent.

[4] Preparation of Crosslinking Agent-Added Film-Forming Composition, and Formation of Cured Film Example 4-1

To PGMEA solution of P-1 prepared in Example 2-1 (12.49 g), added were 0.71 g of blocked isocyanate (BI7992, 1,500 mPa·s, from Baxenden Chemicals, Ltd.), as a crosslinking agent, in the form of 70% by mass solution in PGME, 0.12 g of surfactant Megaface F-563 (from DIC Corporation) in the form of 1% by mass solution in PGMEA, 4.97 g of PGMEA, and 1.70 g of THFA, whose solubilization was visually confirmed, whereby a varnish having a solid content of 15% by mass (referred to as SP-1 solution, hereinafter) was prepared.

The SP-1 solution was spin-coated over a 50 mm×50 mm×0.7 mm thick alkali-free glass substrate with use of a spin coater at 200 rpm for 5 seconds, and then at 1,000 rpm for 30 seconds, pre-dried at 100° C. for one minute on a hot plate, followed by main drying at 250° C. for 5 minutes, to obtain a cured film (referred to as SP-1 film, hereinafter).

Comparative Example 4-1

To CPN solution of P-4 obtained in Comparative Example 2-1 (12.49 g), added were 0.71 g of blocked isocyanate (BI7992, 1,500 mPa·s, from Baxenden Chemicals, Ltd.), as a crosslinking agent, in the form of 70% by mass solution in PGME, 0.12 g of surfactant Megaface R-40 (from DIC Corporation) in the form of 1% by mass solution in PGMEA, and 6.67 g of CPN, whose solubilization was visually confirmed, whereby a varnish having a solid content of 15% by mass (referred to as SP-2 solution, hereinafter) was prepared.

The SP-2 solution was spin-coated over a 50 mm×50 mm×0.7 mm thick alkali-free glass substrate with use of a spin coater at 200 rpm for 5 seconds, and then at 1,000 rpm for 30 seconds, pre-dried at 100° C. for one minute on a hot plate, followed by main drying at 250° C. for 5 minutes, to obtain a cured film (referred to as SP-2 film, hereinafter).

The cured films obtained above were measured regarding the refractive index, thickness and b*, and further verified regarding the yellowing resistance and solvent resistance according to the procedures below.

[Yellowing Resistance]

The yellowing resistance was verified by annealing the obtained cured films at 250° C. for 180 minutes, then measuring the refractive index, the thickness and b*, and by comparing the measured results with those obtained before annealing. The yellowing resistance can be verified particularly on the basis of the amount of increase in b* value, wherein the smaller the amount of increase in this value, the higher the yellowing resistance. Results are summarized in Table 2.

TABLE 2

|  | Example 4-1 | | Comparative Example 4-1 | |
|---|---|---|---|---|
|  | Before annealing | After annealing | Before annealing | After annealing |
| Refractive index (@550 nm) | 1.691 | 1.694 | 1.719 | 1.724 |
| Thickness (nm) | 745 | 738 | 1,098 | 1,083 |
| b* | 0.43 | 0.70 | 0.83 | 1.59 |

As judged from Table 2, the cured film (SP-1 film) in Example 4-1 was found to excel in yellowing resistance, while keeping high refractive index.

[Solvent Resistance (Crack Resistance)]

The substrate with the cured film formed above was set on a spin coater, and thereon 1 ml of CPN was coated. Next, the cured film was exposed to the solvent under rotation at 50 rpm for 60 seconds, while preventing the liquid from being scattered from the substrate. The substrate was then rotated at 1,000 rpm for 30 seconds to spin off the solvent. The substrate was then dried on a hot plate at 120° C. for 10 seconds, and subjected to measurement of the refractive index, film thickness, estimation of residual film ratio, and observation of the film surface under an optical microscope.

The residual film ratio was estimated by the equation below.

Residual film ratio (%)=[(Film thickness after solvent exposure)/(Film thickness before solvent exposure)]×100

Figure 5:
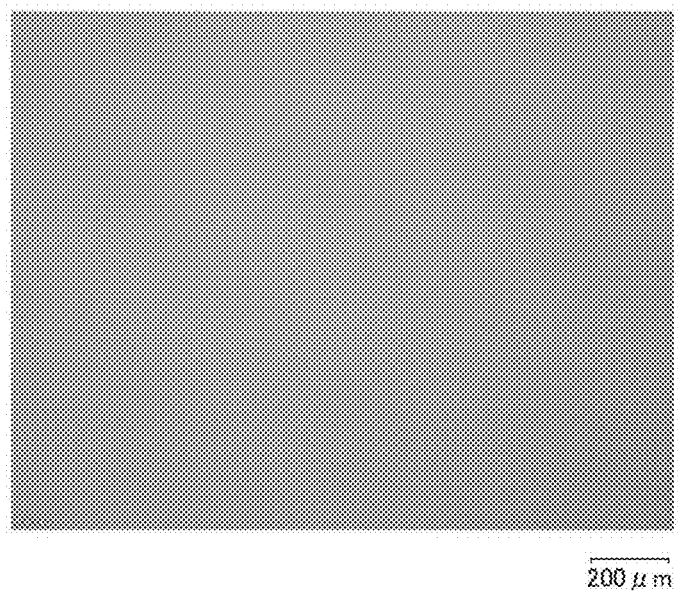
FIG. 5 is an optical microphotograph of a surface of a cured film obtained in Example 4-1, observed after exposed to a solvent.
Figure 6:
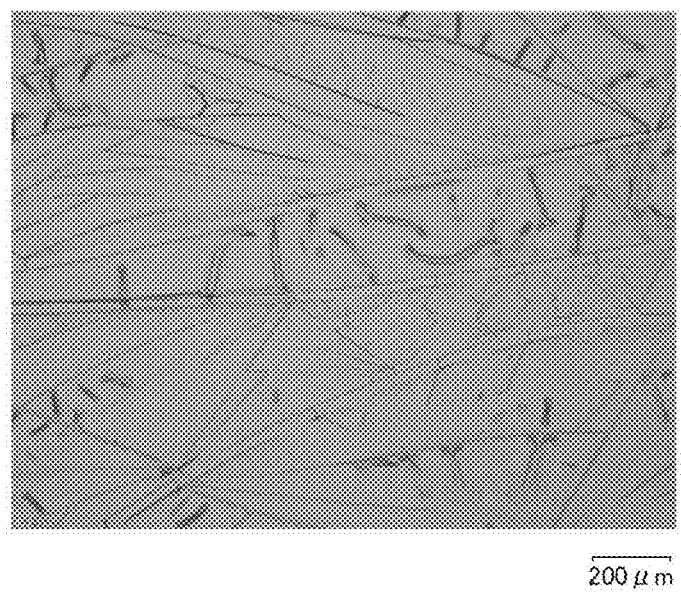
FIG. 6 is an optical microphotograph of a surface of a cured film obtained in Comparative Example 4-1, observed after exposed to a solvent.

Measured results of the refractive index, film thickness, and residual film ratio are summarized in Table 3, a micrograph of the surface of the cured film in Example 4-1 is shown in FIG. 5, and a micrograph of the surface of the cured film in Comparative Examples 4-1 is shown in FIG. 6.

TABLE 3

| | Example 4-1 | | Comparative Example 4-1 | |
|---|---|---|---|---|
| | Before solvent exposure | After solvent exposure | Before solvent exposure | After solvent exposure |
| Refractive index (@550 nm) | 1.691 | 1.695 | 1.719 | Measurement not possible |
| Thickness (nm) | 745 | 730 | 1,098 | |
| Residual film ratio (%) | — | 98 | — | |

The cured film (SP-1 film) in Example 4-1 was found to demonstrate high residual film ratio as judged from Table 3, and found to cause neither surface roughness nor crack as judged from FIG. 5, proving excellence in solvent resistance (crack resistance).

In contrast, the cured film in Comparative Example 4-1 (SP-2 film) was found to cause surface roughness and crack after exposed to the solvent and dried on a hot plate at 120° C. for 10 seconds (see FIG. 6), and was not in a condition suitable for measurement of the refractive index and thickness.

These results teach that the cured film formed of the polymer compound obtained in Example 1-1 excel in solvent resistance (crack resistance), while keeping high refractive index.

The invention claimed is:

1. A triazine ring-containing polymer comprising a repeating unit structure represented by formula (1) below, having at least one triazine ring terminal, and at least a part of the triazine ring terminal being blocked with a fluorine atom-containing arylamino group and with an arylamino group having crosslinking group, wherein the crosslinking group is a hydroxyalkyl group or a (meth)acryloyl-containing group,

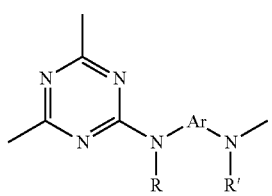

(1)

wherein each of R and R' independently represents a hydrogen atom, an alkyl group, an alkoxy group, an aryl group, or an aralkyl group, and Ar represents at least one group selected from those represented by formulae (2) to (13),

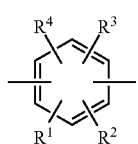

(2)

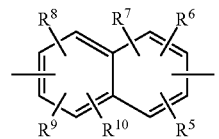

(3)

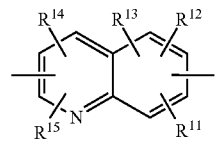

(4)

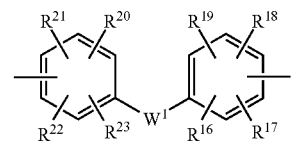

(5)

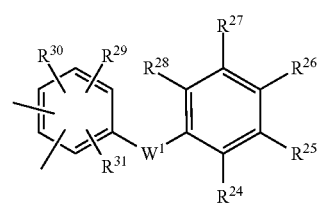

(6)

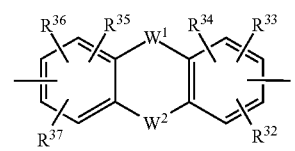

(7)

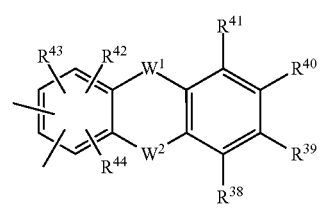

(8)

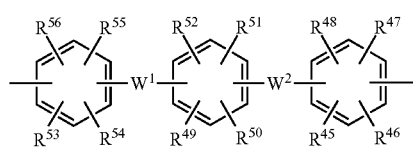

(9)

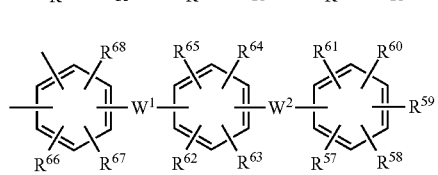

(10)

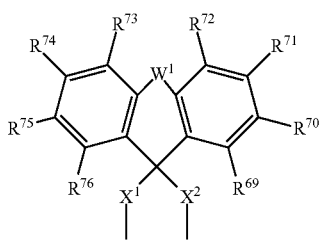

(11)

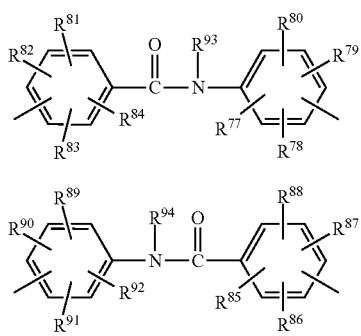

(12)

(13)

wherein each of R¹ to R⁹² independently represents a hydrogen atom, a halogen atom, a carboxy group, a sulfo group, an alkyl group having 1 to 10 carbon atoms, a halogenated alkyl group having 1 to 10 carbon atoms, or an alkoxy group having 1 to 10 carbon atoms, each of R⁹³ and R⁹⁴ represents a hydrogen atom or an alkyl group having 1 to 10 carbon atoms, each of W¹ and W² independently represents a single bond, CR⁹⁵R⁹⁶ (each of R⁹⁵ and R⁹⁶ independently represents a hydrogen atom or an alkyl group having 1 to 10 carbon atoms (where, they may form a ring together)), C=O, O, S, SO, SO₂, or NR⁹⁷ (R⁹⁷ represents a hydrogen atom, an alkyl group having 1 to 10 carbon atoms, or a phenyl group), each of X¹ and X² independently represents a single bond, an alkylene group having 1 to 10 carbon atoms, or a group represented by formula (14),

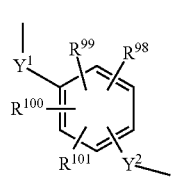

(14)

wherein each of R⁹⁸ to R¹⁰¹ independently represents a hydrogen atom, a halogen atom, a carboxy group, a sulfo group, an alkyl group having 1 to 10 carbon atoms, a halogenated alkyl group having 1 to 10 carbon atoms, or an alkoxy group having 1 to 10 carbon atoms, and each of Y¹ and Y² independently represents a single bond or an alkylene group having 1 to 10 carbon atoms.

2. The triazine ring-containing polymer according to claim 1, wherein each of R¹ to R⁹² and R⁹⁸ to R¹⁰¹ represents a hydrogen atom.

3. The triazine ring-containing polymer according to claim 1, wherein the fluorine atom-containing arylamino group is represented by formula (15),

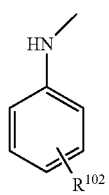

(15)

wherein R¹⁰² represents a fluorine atom or a fluoroalkyl group having 1 to 10 carbon atoms.

4. The triazine ring-containing polymer according to claim 3, wherein the fluorine atom-containing arylamino group is represented by formula (16) or (17),

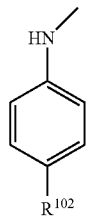

(16)

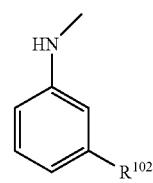

(17)

wherein R¹⁰² is synonymous as above.

5. The triazine ring-containing polymer according to claim 3, wherein R¹⁰² represents a perfluoroalkyl group having 1 to 10 carbon atoms.

6. The triazine ring-containing polymer according to claim 1, wherein the arylamino group having crosslinking group is represented by formula (18),

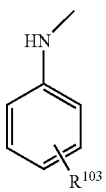

(18)

wherein R¹⁰³ represents a crosslinking group.

7. The triazine ring-containing polymer according to claim 6, wherein the arylamino group having crosslinking group is represented by formula (19),

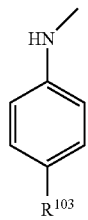

(19)

wherein R¹⁰³ is synonymous as above.

8. The triazine ring-containing polymer according to claim 1, wherein the (meth)acryloyl-containing group is a (meth)acryloyloxyalkyl group, or a group represented by formula (i) below,

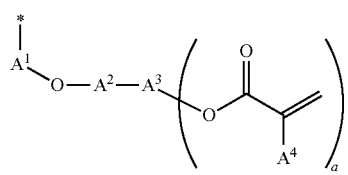

(i)

wherein $A^1$ represents an alkylene group having 1 to 10 carbon atoms, and $A^2$ represents a single bond or a group represented by formula (j) below,

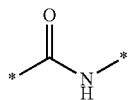

(j)

wherein $A^3$ represents a divalent or trivalent aliphatic hydrocarbon group optionally substituted with hydroxy group, $A^4$ represents a hydrogen atom or a methyl group, a represents 1 or 2, and * represents a site of bonding.

9. The triazine ring-containing polymer according to claim 1, wherein the crosslinking group is one or more groups selected from hydroxymethyl group, 2-hydroxyethyl group, (meth)acryloyloxymethyl group, (meth)acryloyloxyethyl group, and groups represented by formulae (i-2) to (i-5) below,

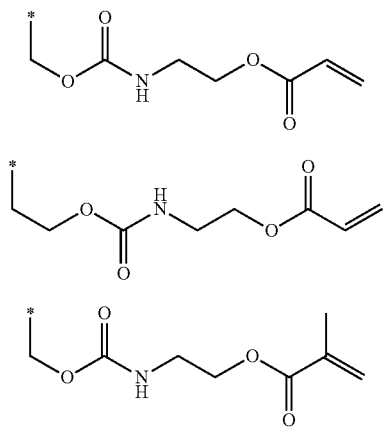

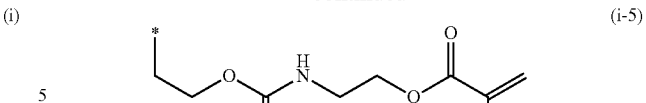

(i-5)

wherein * represents a site of bonding.

10. The triazine ring-containing polymer according to claim 1, wherein Ar is represented by formula (20) or (21)

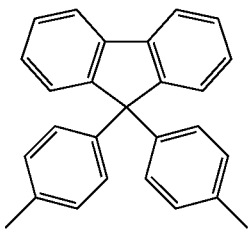

(20)

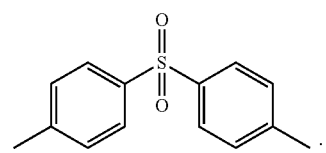

(21)

11. A film-forming composition comprising the triazine ring-containing polymer according to claim 1, and an organic solvent.

12. The film-forming composition according to claim 11, wherein the organic solvent contains at least one selected from glycol ester-based solvent, ketone-based solvent, and ester-based solvent.

13. The film-forming composition according to claim 11, further comprising a crosslinking agent.

14. The film-forming composition according to claim 13, wherein the crosslinking agent is a polyfunctional (meth)acrylic compound.

15. A film obtained from the film-forming composition according to claim 11.

16. An electronic device comprising a base, and the film according to claim 15 formed on the base.

17. An optical component comprising a base, and the film according to claim 15 formed on the base.

* * * * *